US012053352B2

(12) United States Patent
Pearen et al.

(10) Patent No.: US 12,053,352 B2
(45) Date of Patent: Aug. 6, 2024

(54) BITE BLOCK

(71) Applicant: Keen Products Inc., King City (CA)

(72) Inventors: Christopher J. Pearen, Brampton (CA); Gary Vilinsky, King City (CA); Robert G. Dickie, King City (CA); David Everett Huizenga, Anderson, SC (US)

(73) Assignee: Keen Products Inc. (CA)

( * ) Notice: Subject to any disclaimer, the term of this patent is extended or adjusted under 35 U.S.C. 154(b) by 767 days.

(21) Appl. No.: 17/223,679

(22) Filed: Apr. 6, 2021

(65) Prior Publication Data

US 2021/0220104 A1 Jul. 22, 2021

Related U.S. Application Data

(63) Continuation-in-part of application No. 15/023,190, filed as application No. PCT/US2014/056404 on Sep. 18, 2014, now abandoned.

(60) Provisional application No. 61/879,457, filed on Sep. 18, 2013.

(51) Int. Cl.
*A61D 15/00* (2006.01)

(52) U.S. Cl.
CPC .................................... *A61D 15/00* (2013.01)

(58) Field of Classification Search
CPC . A61C 5/90; A61D 15/00; A61D 7/04; A61D 7/00; A61M 31/00; A61B 2017/00424; A61B 2017/00438
USPC .... 433/40, 93, 140; 600/237, 238, 239, 243, 600/244
See application file for complete search history.

(56) References Cited

U.S. PATENT DOCUMENTS

| | | | | |
|---|---|---|---|---|
| 527,235 A | | 10/1894 | Carpi | |
| 2,220,674 A | * | 11/1940 | Bloomheart ............ | A61C 5/90 600/238 |

(Continued)

FOREIGN PATENT DOCUMENTS

| | | |
|---|---|---|
| FR | 2952523 | 9/2011 |
| WO | 2009138527 | 11/2009 |

OTHER PUBLICATIONS

International Search Report and Written Opinion of the International Searching Authority from International Application No. PCT/US2014/056404, mailed Dec. 29, 2014, 13 pages.

*Primary Examiner* — Matthew J Lawson
(74) *Attorney, Agent, or Firm* — Sand, Sebolt & Wernow Co., LPA

(57) ABSTRACT

A bite block and method of using the same in an animal's mouth. The bite block includes a gripping region, a bite receiving region and a transition region therebetween. A person's middle finger is inserted through an aperture defined in the gripping region. The person's index finger rests in an indentation in a top of the gripping region above the aperture. A lingual plate on the bite receiving region is elliptically-shaped and has a concave end wall that rests against the animal's tongue. Upper and lower troughs are located between the bite receiving and transition regions to receive maxillary and mandibular teeth, respectively, therein. The lingual plate is transversely-oriented relative to the bite block's longitudinal axis. The lingual plate is generally elliptical in shape when the bite block is viewed from a second end, being wider than tall, and includes a concave end face that is seated against the tongue.

22 Claims, 18 Drawing Sheets

(56) References Cited

U.S. PATENT DOCUMENTS

| | | | | |
|---|---|---|---|---|
| 4,975,057 | A * | 12/1990 | Dyfvermark | A61B 1/24 433/91 |
| 5,205,733 | A * | 4/1993 | Scheels | A61D 5/00 433/140 |
| 5,347,996 | A * | 9/1994 | Huan | A61B 1/24 433/140 |
| 5,477,431 | A | 12/1995 | Curameng, Jr. | |
| 5,769,635 | A | 6/1998 | Eldreth | |
| 5,911,197 | A | 6/1999 | Schmid | |
| 5,993,413 | A | 11/1999 | Aaltonen et al. | |
| D420,447 | S | 2/2000 | Rohrig | |
| 6,241,521 | B1 | 6/2001 | Garrison | |
| 6,267,591 | B1 * | 7/2001 | Barstow | A61B 1/247 433/140 |
| 6,721,959 | B1 | 4/2004 | Hairston | |
| 6,743,017 | B2 | 6/2004 | O'Neil | |
| 7,066,735 | B1 | 6/2006 | Gasporra | |
| D531,314 | S | 10/2006 | Atkinson et al. | |
| 8,146,601 | B2 | 4/2012 | James, Jr. | |
| D685,485 | S | 7/2013 | Swern et al. | |
| 8,535,056 | B2 * | 9/2013 | Dragan | A61B 1/0014 433/140 |
| D883,493 | S | 5/2020 | Wallis | |
| D917,051 | S | 4/2021 | Kauffman et al. | |
| 11,826,026 | B2 * | 11/2023 | Harman | A61C 17/10 |
| 2002/0189613 | A1 | 12/2002 | Fitton | |
| 2004/0033468 | A1 * | 2/2004 | Fischer | A61C 5/90 433/140 |
| 2005/0217123 | A1 * | 10/2005 | Ferman | B26B 13/20 30/341 |
| 2006/0110705 | A1 | 5/2006 | Jensen et al. | |
| 2010/0083970 | A1 | 4/2010 | Beely et al. | |
| 2010/0297579 | A1 | 11/2010 | Beloff | |
| 2011/0209715 | A1 * | 9/2011 | Burdumy | A61C 5/90 128/861 |
| 2011/0244417 | A1 | 10/2011 | Hilsen et al. | |
| 2016/0242885 | A1 * | 8/2016 | Dickie | A61D 15/00 |
| 2016/0310234 | A1 * | 10/2016 | Ritter | A61C 17/08 |
| 2020/0170754 | A1 * | 6/2020 | Lombardi | A61C 9/0006 |
| 2021/0220104 | A1 | 7/2021 | Pearen et al. | |
| 2024/0156568 | A1 * | 5/2024 | Perry | A61C 5/90 |

* cited by examiner

BITE BLOCK

CROSS REFERENCE TO RELATED APPLICATIONS

This application is a Continuation-in-Part of U.S. patent application Ser. No. 15/023,190, filed Mar. 18, 2016, which is a National Stage Entry of PCT/US2014/056404 having an International Filing date of Sep. 18, 2014, which application claims the benefit of U.S. Provisional Application Ser. No. 61/879,457 filed on Sep. 18, 2013; the entire disclosures of these applications being incorporated herein by reference.

TECHNICAL FIELD

This disclosure is generally directed to pet supplies. More particularly, the present disclosure relates to bite blocks for animals. Specifically, the present disclosure is directed to a bite block which is usable with a single hand to separate an animal's jaws and keep their head stable while the animal's teeth are brushed or medication is minister using a person's other hand. The bite block body a gripping region, transition region, and a bite receiving region aligned along a longitudinal axis. The person's middle finger is inserted through an aperture defined in the gripping region and oriented perpendicular to the longitudinal axis. The person's index finger is seated in an indentation defined in a top of the gripping region. The transition region flares outwardly to shield the middle and index fingers. An elliptically-shaped lingual plate provided on the end of the bite receiving region is separated from the transition region by an annular groove configured to receive some of the animal's teeth therein. The end wall of the lingual plate is placed in contact with a side of the animal's tongue.

BACKGROUND

Background Information

Bite blocks are used to help hold an animal's mouth in an open position for a number of reasons such as during surgical procedures or when the animal's teeth are cleaned or medication is administered to the animal. A number of bite blocks have been proposed in the prior art but they typically have to be held between a thumb and index finger of the person. Because of this, many of these prior art bite blocks cannot be retained easily in the animal's mouth in a single hand in a sufficiently stable manner as to leave a person's other hand free to perform a task like brushing the animal's teeth or administering medication.

SUMMARY

A bite block and method of using the same in an animal's mouth is disclosed herein that addresses some of the issues experienced in prior art bite blocks. The bite block in accordance with the present disclosure includes a gripping region, a bite receiving region, and a transition region located therebetween. A person's middle finger is inserted through an aperture defined in the gripping region. The person's index finger rests in an indentation in a top of the gripping region above the aperture. A lingual plate on the bite receiving region is elliptically-shaped and has a concave end wall that rests against the animal's tongue. Upper and lower troughs are located between the bite receiving and transition regions to receive maxillary and mandibular teeth, respectively, therein. The lingual plate is transversely-oriented relative to the bite block's longitudinal axis. The lingual plate is generally elliptical in shape when the bite block is viewed from a second end, being wider than tall, and includes a concave end face that is seated against the tongue. The transition region flares in height and width moving longitudinally in a direction away from the gripping region and towards the bite receiving region. The larger dimensioned transition region helps to shield the person's digits, which are engaged with the gripping region from being accidentally bitten. The bite block is engaged with one of the person's hands and the person's thumb and other digits are positioned on the animal's muzzle and lower jaw to stabilize the animal's head. The person is then able to use their other hand to brush the animal's teeth or administer medication, or any other task that requires the person insert liquids or solid objects into the animal's mouth. The bite block holds the animal's upper and lower jaws a distance apart for safely performing whatever tasks are necessary with the person's other hand.

In one aspect, an exemplary embodiment of the present disclosure may provide a bite block comprising a body having a front and an opposed back, a top and an opposed bottom, a first end and an opposed second end, wherein a longitudinal axis of the body extends between the first end and the second end; a gripping region provided proximate the first end of the body and adapted to be engaged by a hand of a person; a bite receiving region provided proximate the second end of the body and adapted to be received in a mouth of an animal; an aperture defined in the gripping region, said aperture extending between the front and the back of the body and transverse to the longitudinal axis, said aperture being configured to receive a first digit of a person's hand therethrough; and an indentation defined in the top of the body in the gripping region, said indentation located a distance vertically above the aperture and adapted to receive a second digit of the person's hand therein.

In one embodiment, the indentation may be oriented transverse to the longitudinal axis of the body. In one embodiment, the indentation may be flanked by a first projection and a second projection. In one embodiment, the first projection and the second projection may be oriented generally parallel to a transverse axis of the body; wherein the transverse axis extends between the front and the back of the body.

In one embodiment, a transition region may be interposed between the gripping region and the bite receiving region. In one embodiment, the bite receiving region may include a lingual plate located at the second end of the body. In one embodiment, the lingual plate may be elliptical in shape when the body is viewed from the second end. In one embodiment, the lingual plate may be of a greater width than height, wherein the width is measured transversely between the front and the back of the body and the height is measured vertically between the top and the bottom of the body. In one embodiment, the lingual plate may be separated from the gripping region by an annular groove, wherein a first region of the annular groove in the top of the body defines an upper trough, wherein a second region of the annular groove in the bottom of the body defines a lower trough, and when the bite receiving region is received in the mouth of the animal said upper trough receives one or more maxillary teeth therein and said lower trough receives one or more mandibular teeth therein. In one embodiment, the gripping region may increases in height and width moving in a longitudinal direction from the first end of the body towards the transition region; wherein the height is measured vertically from the top to the bottom of the body, and the width is measured laterally between the front and back of the body; and wherein the transition region decreases in height and increases in width moving in the longitudinal direction from the gripping region towards the biting region. In one embodiment, the transition region may be of a maximum width and a minimum height at the annular groove. In one embodiment, the lingual plate may be of a smaller height and a smaller width than the maximum width and minimum height of the transition region. In one embodiment, the lingual plate may be of a greater height and a greater width than any part of the transition region.

In one embodiment, the upper trough and the lower trough may be oriented generally at right angles to the longitudinal axis of the body. In one embodiment, the indentation may be vertically aligned with the aperture. In one embodiment, the gripping region may further include a bottom portion that is provided in the bottom of the body opposed to the indentation, and wherein the bottom portion is convexly curved and is adapted to receive another digit of the person's hand thereagainst. In one embodiment a part of the bite receiving region circumscribed by the annular groove may be of a width that is substantially equal to a width of the gripping region proximate the first end of the body. In one embodiment, a part of the bite receiving region circumscribed by the annular groove may be of a width that is greater than a width of the gripping region proximate the first end of the body. In one embodiment the lingual plate may have an end wall that forms the second end of the body and the lingual plate's end wall may be generally vertically oriented and concavely curved.

In another aspect, an exemplary embodiment of the present disclosure may provide a bite block comprising a body having a front and an opposed back, a top and an opposed bottom, a first end and an opposed second end, wherein a longitudinal axis of the body extends between the first end and the second end; a gripping region provided proximate the first end of the body and adapted to be engaged by a hand of a person; and a bite receiving region provided proximate the second end of the body and adapted to be received in a mouth of an animal; said bite receiving region including a lingual plate forming the second end of the body, said lingual plate being elliptical in shape when the body is viewed from the second end, wherein said lingual plate is adapted to contact the animal's tongue when the bite receiving region is received in the mouth of the animal.

In one embodiment, the lingual plate may be oriented generally transversely relative to the longitudinal axis. In one embodiment, the lingual plate may include an end wall oriented generally transverse to the longitudinal axis, and wherein the end wall may be concavely curved and adapted to allow the animal's tongue to rest generally naturally in the animal's mouth when contacted by the lingual plate. In one embodiment, the bite receiving region may further include an upper trough defined in the top of the body, said upper trough being adapted to receive one or more maxillary teeth of an upper jaw therein when the bite receiving region is received in the mouth of the animal; and a lower trough defined in the bottom of the body, said lower trough being adapted to receive one or more mandibular teeth of a lower jaw therein when the bite receiving region is received in the mouth of the animal; and wherein the upper trough an lower trough may be located intermediate the lingual plate and the gripping region. In one embodiment, the upper and lower trough may be oriented generally transverse to the longitudinal axis of the body. In one embodiment, the bite block may further comprise a transition region may located between the gripping region and the upper and lower troughs, wherein the transition region is of a greater height and width than a part of the bite receiving region in which the upper and lower troughs are defined.

In one embodiment, the lingual plate may be of a smaller width and a smaller height than a width and a height of the transition region proximate the upper and lower troughs, wherein the width and smaller width are measured vertically between the front and the back of the body, and the height and the smaller height are measured transversely between the top and the bottom of the body. In one embodiment, the lingual plate may be of a greater width and a greater height than a width and a height of the transition region proximate the upper and lower troughs, wherein the width and greater width are measured vertically between the front and the back of the body, and the height and the greater height are measured transversely between the top and the bottom of the body.

In another aspect, and exemplary embodiment of the present disclosure may provide a method of installing a bite block in an animal's mouth comprising providing a bite block with a body having a gripping region at a first end and a bite receiving region at a second end, and a longitudinal axis extending between the first end and the second end; inserting a first digit of a person's hand through an aperture defined in the gripping region, wherein the aperture is oriented transverse to the longitudinal axis; resting a second digit of the person's hand in an indentation defined in a top of the body in the gripping region, wherein the indentation is located a distance vertically above the aperture; providing a lingual plate on the bite receiving region of the body, wherein the lingual plate is oriented generally transversely with respect to the longitudinal axis of the body; orienting the lingual plate generally parallel to a palm of the person's hand; inserting the lingual plate into the animal's mouth such that an end wall of the lingual plate contacts the animal's tongue; receiving one or more maxillary teeth of the animal's upper jaw into an upper trough defined in the top of the body in the bite receiving region, wherein the upper trough is located inwardly from the lingual plate in a direction moving longitudinally towards the gripping region; and receiving one or more mandibular teeth of the animal's lower jaw into a lower trough defined in a bottom of the body in the bite receiving region, wherein the lower trough is opposed to the upper trough.

In one embodiment, the inserting of the first digit may comprise inserting the person's middle finger through the aperture, and wherein the resting of the second digit comprises resting the person's index finger in the indentation. In one embodiment, the method may further comprise placing g a thumb of the person's hand on the animal's muzzle; placing one or both of a third digit and a fourth digit of the person's hand under the animal's lower jaw; holding the animal's head stably between the thumb, the third digit, and the fourth digit of the person's hand; and performing a task in the animal's mouth with a second hand of the person. In one embodiment, the inserting of the first digit of the person's hand into the aperture may include orienting the first digit generally perpendicular to the longitudinal axis of the body. In one embodiment, the method may further comprise orienting the first digit of the person's hand generally parallel to the lingual plate of the bite block. In one embodiment, the inserting of the first digit of the person's hand may be preceded by selecting an appropriately-sized bite block based on a size of the mouth of the animal into which the bite block is to be inserted. In one embodiment the method may further comprise flaring the front, the back, a top, and a bottom of the body outwardly in a direction moving longitudinally away from the first end of the body and towards the bite receiving region, and shielding the person's first digit and second digit from accidentally being bitten with the flaring front, back, top, and bottom of the body.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
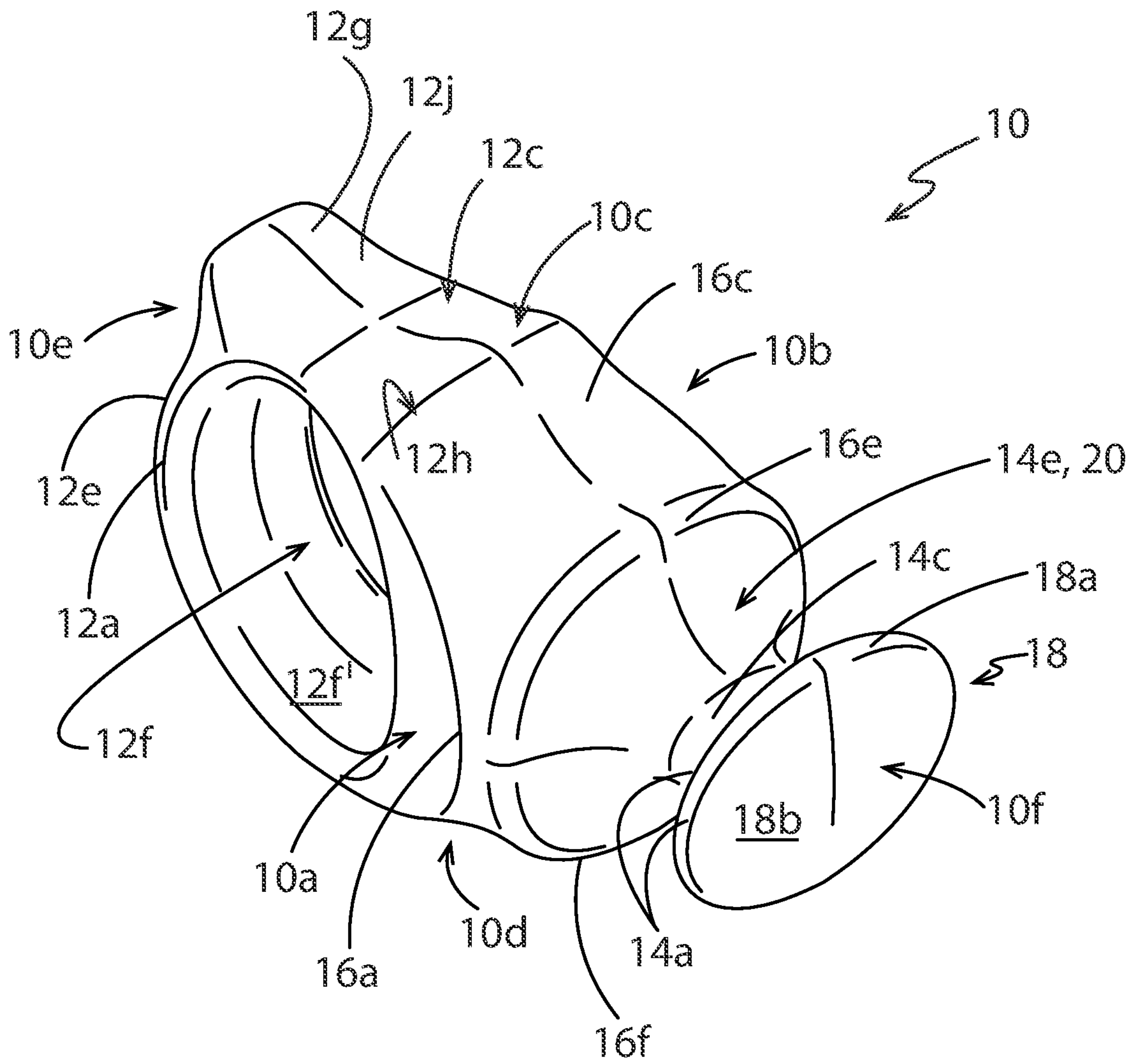
FIG. 1 is front, top, right end isometric perspective view of a first embodiment of a bite block in accordance with an aspect of the present disclosure.
Figure 2:
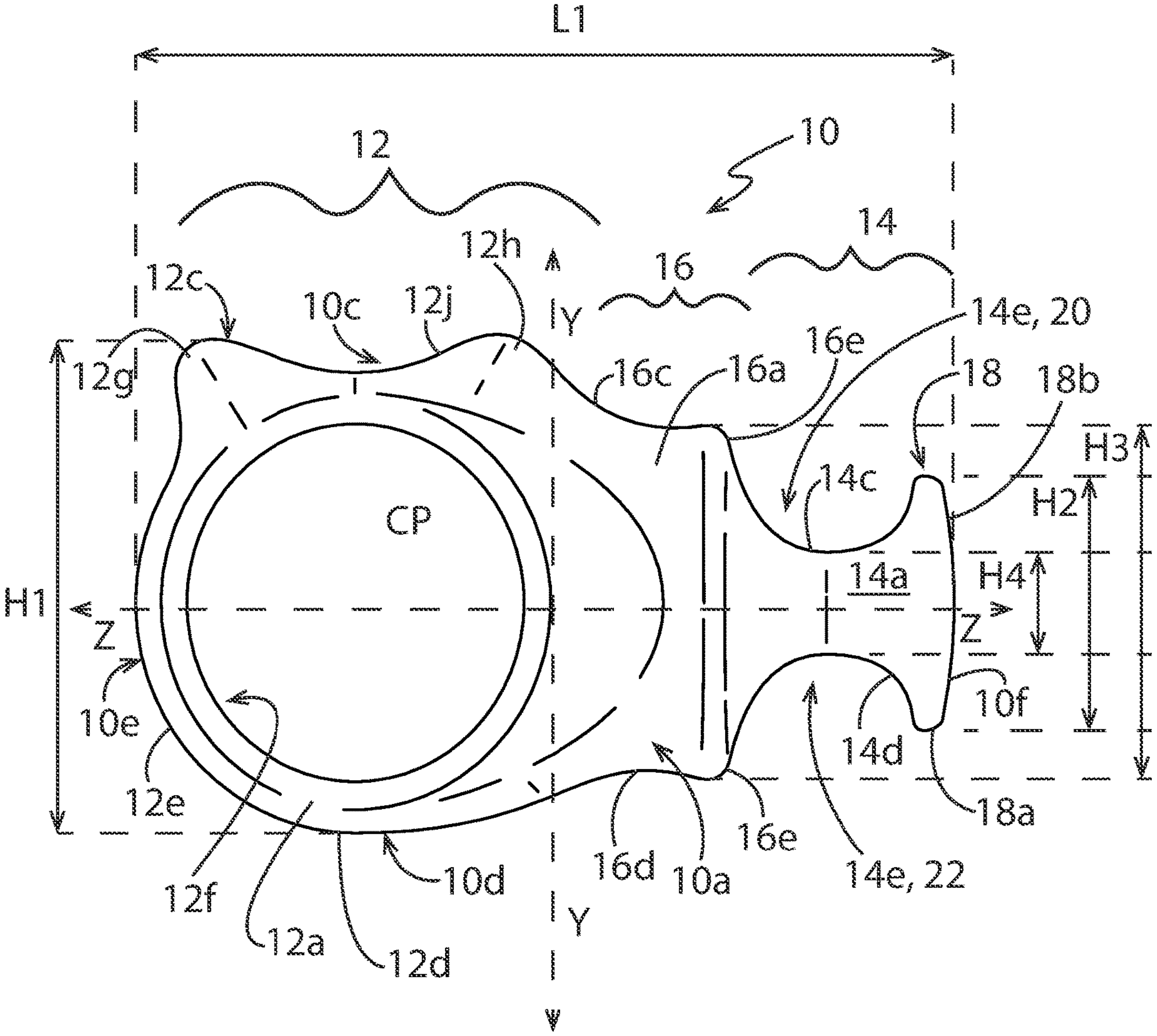
FIG. 2 is a front elevation view of the bite block of FIG. 1.
Figure 3:
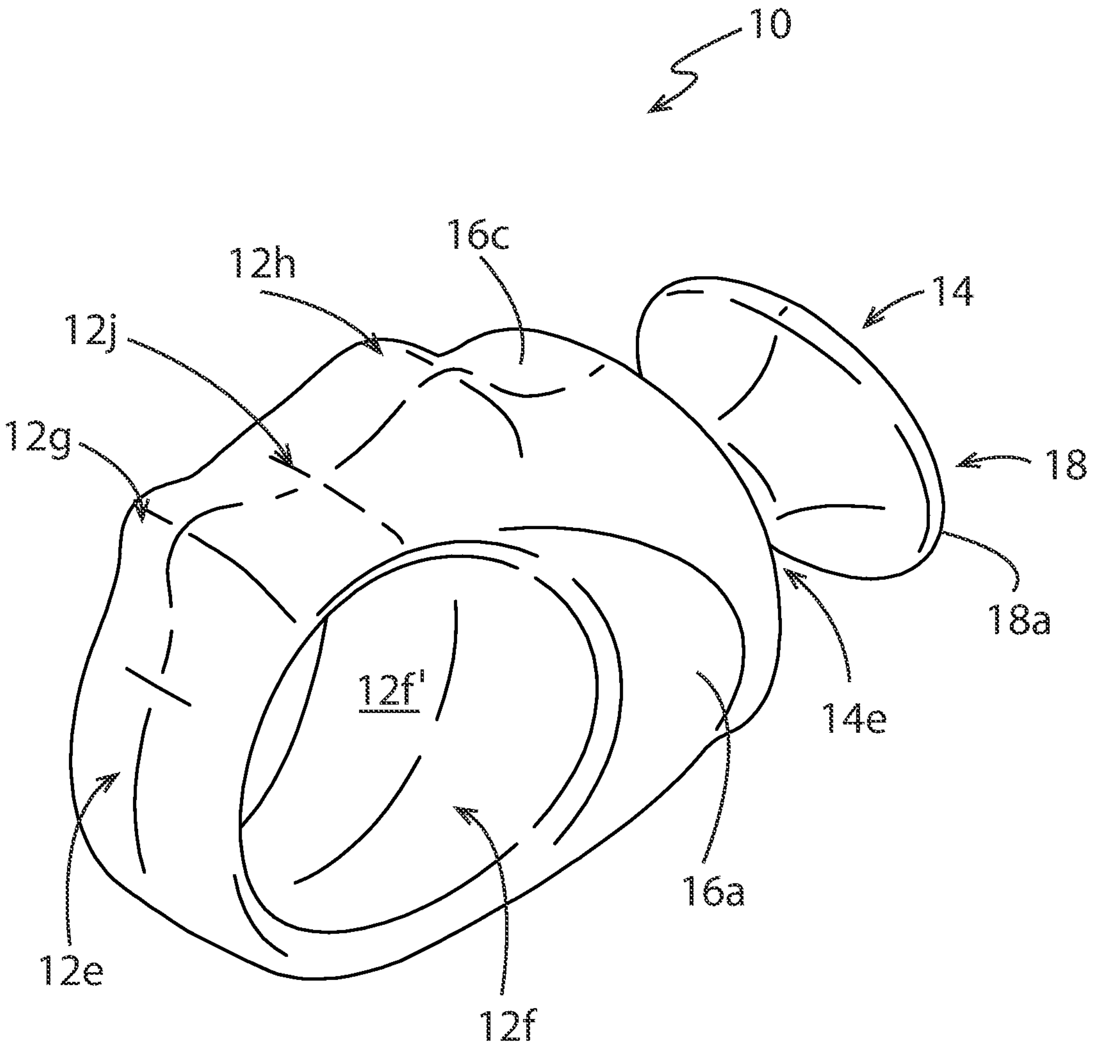
FIG. 3 is a rear elevation view of the bite block of FIG. 1.

Referring to FIGS. 1 to 7, there is shown a first embodiment of a bite block in accordance with an aspect of the present disclosure, generally indicated at 10. Bite block 10, as indicated in FIGS. 1 to 3, comprises a body having a front 10*a*, a back 10*b*, a top 10*c*, a bottom 10*d*, a left end 10*e*, and a right end 10*f*. The terms "front", "back", "top", "bottom", "left end", and "right end", are used to denote various surfaces of bite block 10 relative to the orientation of the bite block body shown in the attached figures.

The body of bite block 10 is a unitary, monolithic component that is integrally formed. In other words, the body of bite block 10 is formed as a single component. Bite block 10 may be fabricated by molding or die-casting any suitable material. In one embodiment, bite block 10 may be molded as one-piece as this type of constructions tends to increase the durability of the bite block 10. One suitable material for molding bite block 10 is rubber. The rubber may be natural rubber with a durometer in a range of about 70. Alternative materials for molding bite block 10 may include rubber as one of the components or materials such as silicone. Silicone of durometer 45 is one suitable type of silicone. These materials are suitable because it is sufficiently strong enough to resist cracking or puncture under pressure from an animal's jaw and teeth. Additional suitable materials include but are not limited to silicone or an elastomeric plastic. The bite block material may include other compounds such as sterilizing agents which will leach out of the bite block 10 over time and keep the device relatively sanitary for repeated used.

Referring still to FIGS. 1-7, bite block 10 has a transverse axis "X-X" (FIG. 3) extending between front 10*a* and back 10*b* and defines a lateral or transverse direction therebetween. Bite block 10 has a vertical axis Y-Y that extends between top 10*c* and bottom 10*d* and defines a vertical direction therebetween. Bite block 10 has a longitudinal axis Z-Z (FIG. 2) that extends between left end 10*e* and right end 10*f* and defines a longitudinal direction therebetween. Transverse axis X-X and vertical axis Y-Y are oriented at right angles to one another. Transverse axis X-X and longitudinal axis Z-Z are oriented at right angles to one another. Vertical axis Y-Y and longitudinal axis Z-Z are oriented at right angles to one another.

Figure 4:
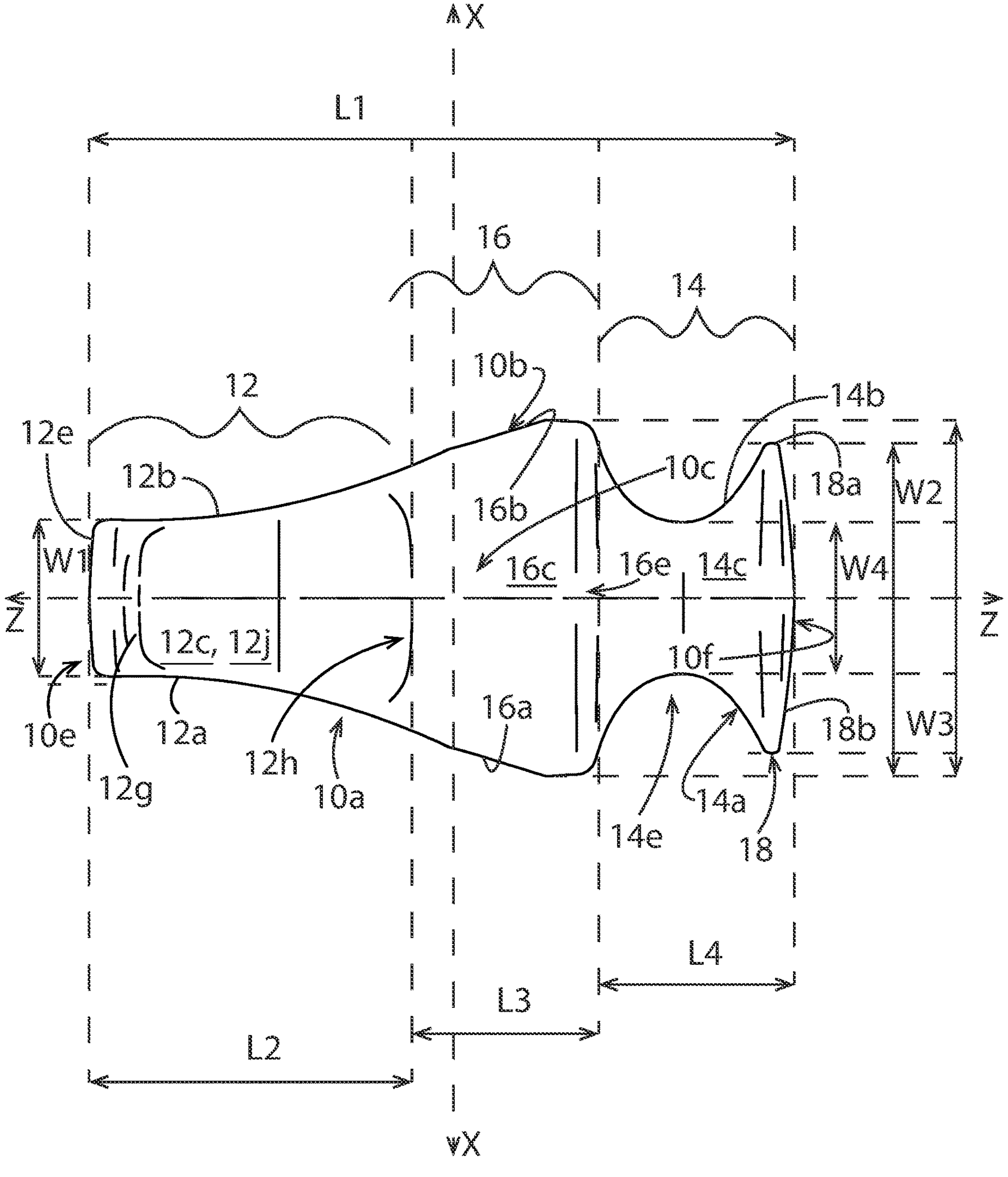
FIG. 4 is a top plan view of the bite block of FIG. 1.
Figure 5:
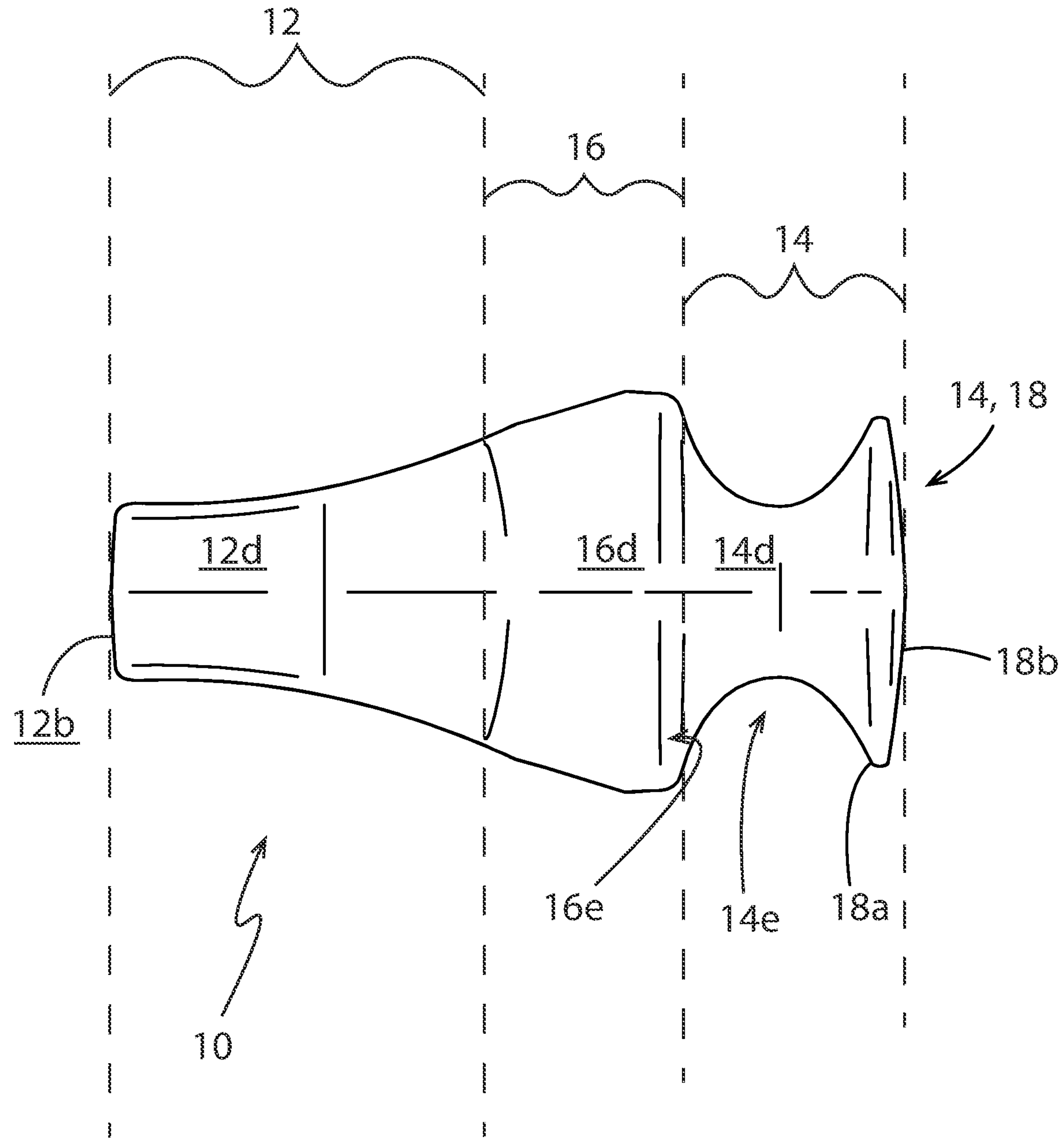
FIG. 5 is a bottom plan view of the bite block of FIG. 1.

As best seen in FIGS. 2 through 4, bite block 10 generally comprises three regions, namely a gripping region 12, a bite receiving region 14, and a transition region 16. The gripping region 12 is utilized by a person to hold onto bite block 10, to manipulate bite block 10, to place bite block 10 in an animal's mouth, and to remove bite block 10 from an animal's mouth. Bite receiving region 14 is placed in an animal's mouth and is configured so that the bite receiving region 14 will comfortably be received between the teeth on the animal's upper jaw and the teeth on the lower jaw, and will comfortably tend to keep the animal's tongue in a substantially natural position where the tongue is located where the animal's teeth will not inadvertently bite down on the animal's tongue. Transition region 16 is located between gripping region 12 and bite receiving region 14. Transition region 16 is provided to help ensure that there is sufficient distance between the animal's jaws and teeth, and the fingers of the person holding the gripping region 12 for installing or removing the bite block 10. Each of the gripping region 12, the bite receiving region 14, and the transition region 16 are specially configured for the person and the animal to comfortably and safely use the bite block 10.

Gripping region 12 will now be discussed in greater detail with continued reference to FIGS. 1-7. Gripping region 12 originates in left end 10*e* of bite block 10 and extends longitudinally towards right end 10*f* thereof. Bite receiving region 14 originates in right end 10*f* of bite block 10 and extends longitudinally towards left end 10*e* thereof. Transition 16 is interposed between gripping region 12 and bite receiving region 14. Front 10*a* of bite block 10 comprises a first front portion 12*a*, a second front portion 16*a*, and a third front portion 14*a*. The first, second, and third front portions 12*a*, 16*a*, 14*a* are substantially continuous with one another but are differently configured from one another as will be described hereafter. Similarly, the rear 10*b* of bite block 10 comprises a first rear portion 12*b*, a second rear portion 16*b*, and a third rear portion 14*b*. The first, second, and third rear portions 12*b*, 16*b*, 14*b* are substantially continuous with one another but are differently configured from one another as will be described hereafter. Still further, top 10*c* of bite block 10 comprises a first top portion 12*c*, a second top portion 16*c*, and a third top portion 14*c*. The first, second, and third top portions 12*c*, 16*c*, 14*c* are substantially continuous with one another but are differently configured from one another as will be described hereafter. Finally, the bottom 10*d* of bite block 10 comprises a first bottom portion 12*d*, a second bottom portion 16*d*, and a third bottom portion 14*d*. The first, second, and third bottom portions 12*d*, 16*d*, 14*d* are substantially continuous with one another but are differently configured from one another as will be described hereafter.

Gripping region 12 comprises the first front portion 12*a*, the first rear portion 12*b*, the first top portion 12*c*, and the first bottom portion 12*d* discussed above. An end wall 12*e* extends between first front portion 12*a*, first rear portion 12*b*, first top portion 12*c*, and first bottom portion 12*d*. An aperture 12*f* is defined in gripping region 12 with the aperture 12*f* extending between first front portion 12*a* and first rear portion 12*b*. In particular, aperture 12*f* is bounded and defined by a circumferential wall 12*f* (FIG. 1) of gripping region 12. Aperture 12*f* is substantially cylindrical in shape and is suitably sized to receive a person's digit therethrough.

Figure 8:
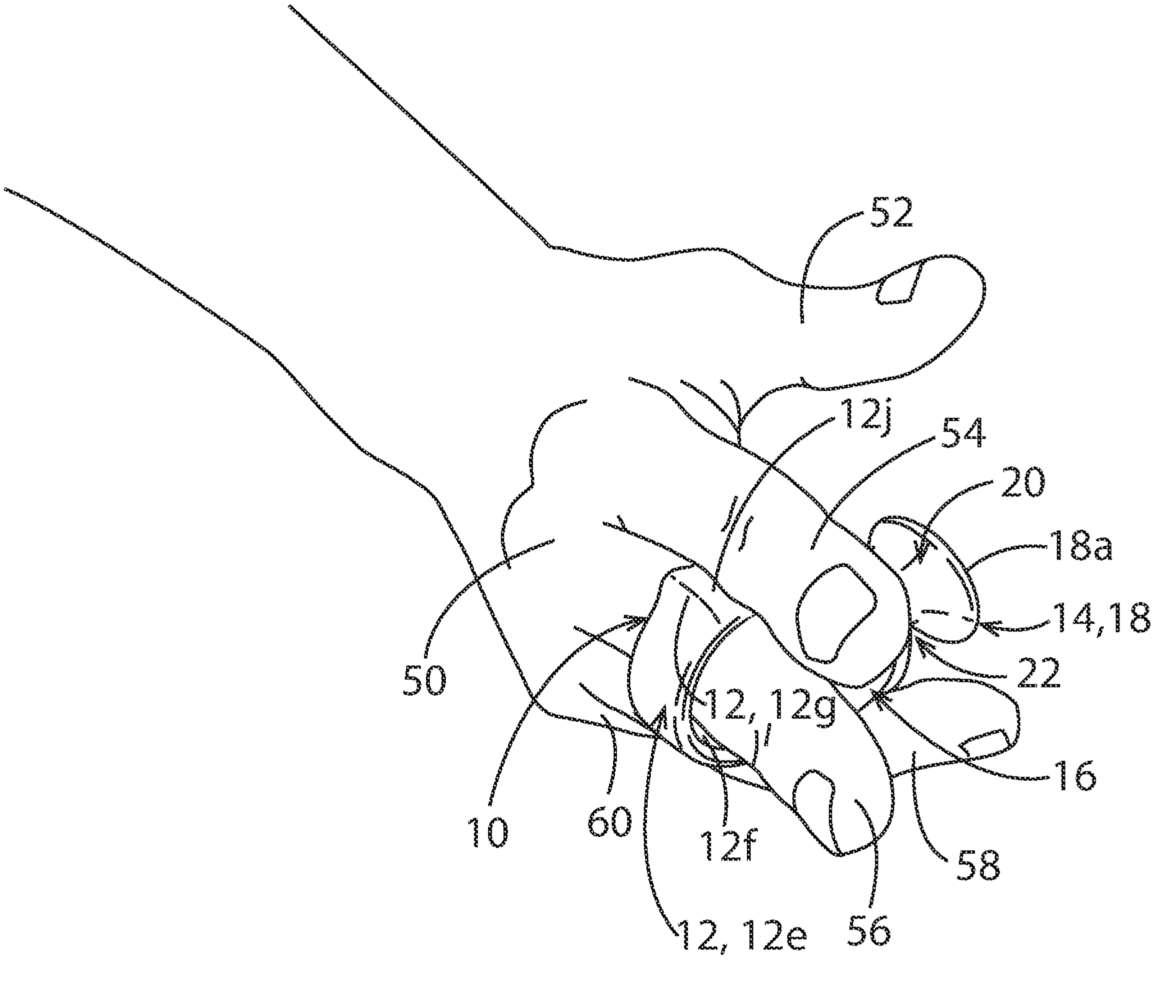
FIG. 8 is a front, top, left end perspective view of the bite block of FIG. 1 being held in a person's hand in an orientation ready for insertion into a right side of an animal's mouth.

FIG. 8 shows bite block 10 engaged with a person's right hand 50. The person's hand 50 includes a thumb 52, an index finger 54, a middle finger 56, a ring finger 58, and a little finger 60. As shown in FIG. 8, aperture 12*f* may be shaped and sized to be able to receive one of the person's digits therein. In particular, the person's index finger 54 or middle finger 56 may be received therethrough. It will be understood however that the bite block 10 is completely reversible and may be engaged with the person's left hand instead of their right hand 50. End wall 12*e* and first bottom portion 12*d* of gripping region 12, together, form an arcuate curve of a substantially constant radius of curvature relative to an imaginary center point "CP" of aperture 12*f*.

First top portion 12*c* of gripping region is shaped to include a first projection 12*g* and a second projection 12*h* that are separated from one another by an indentation 12*j*. Each of the projections 12*g*, 12*h* is generally an inverted "U-shape" in configuration when bite block 10 is viewed from the front (as in FIG. 2) of from the back (as in FIG. 3). End wall 12*e* originates and extends downwardly from a left end surface of the first projection 12*g*. Second top portion 16*c* originates and extends downward from a right end surface of the second projection 12*h*.

The indentation 12*j* is concave in shape and is of a substantially constant radius of curvature. The indentation 12*j* is generally centered above the center point "CP" of aperture 12*f*. Indentation 12*j* is shaped and sized to selectively receive a first digit of the person's hand therein. As shown in FIG. 8, for example, when middle finger 56 of the person's right hand 50 is received through aperture 12*f*, the person's index finger 54 rests in the indentation 12*j*. The first projection 12*g* and second projection 12*h* help keep the person's index finger 54 seated in the indentation 12*j* and help to stop the person's index finger 54 from slipping off gripping portion 12. Inserting the middle finger 56 through aperture 12*f* and positioning index finger 54 in the indentation 12*j* helps to arrest any rotation of bite block 10. This arrangement of engaging the bite block with the user's hand helps to stabilize bite block 10 in the animal's mouth, as will be described later herein.

Figure 9:
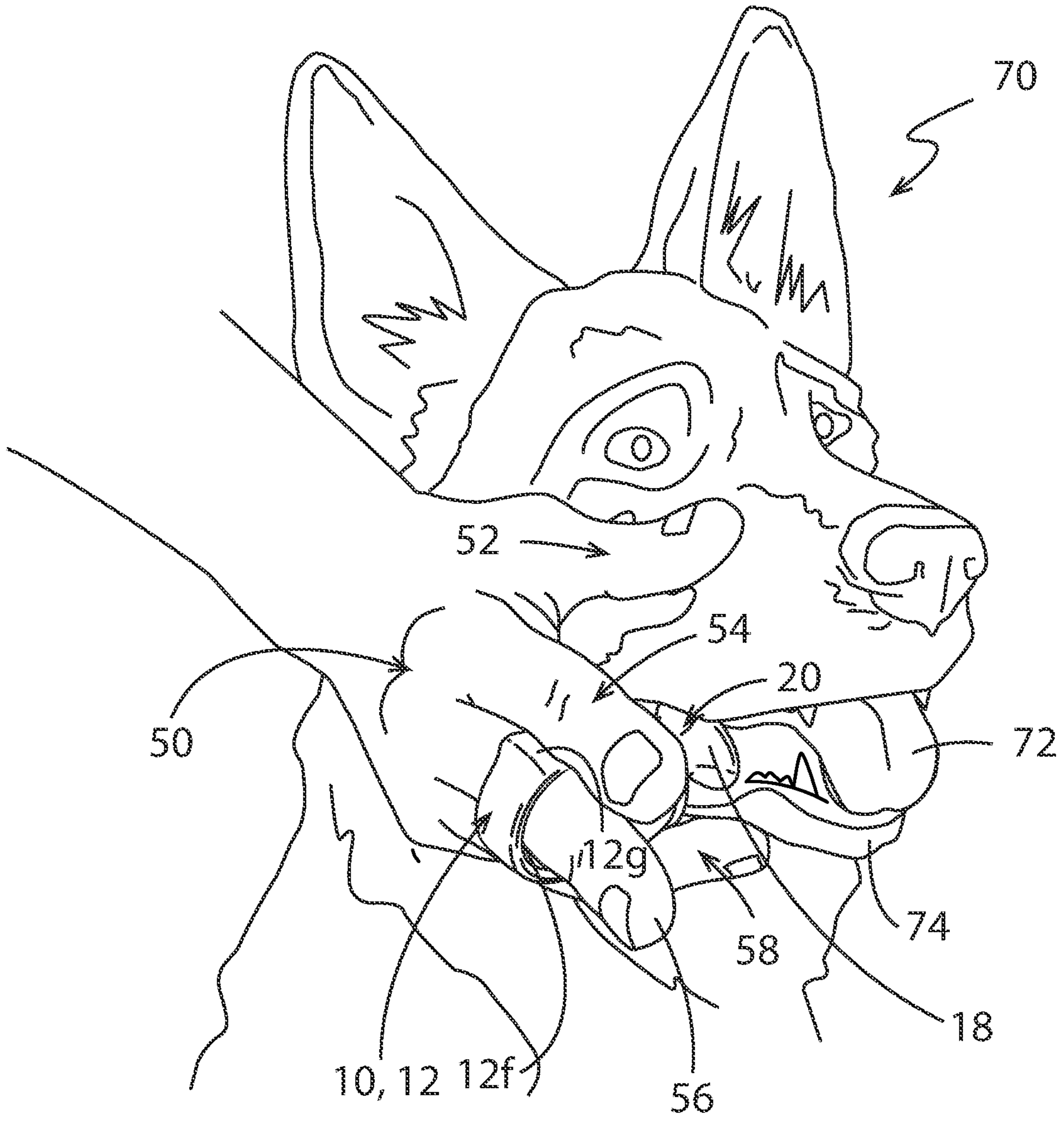
FIG. 9 is a front, top, left end perspective view of the bite block of FIG. 1 inserted into a right-hand-side of a dog's mouth.
Figure 10:
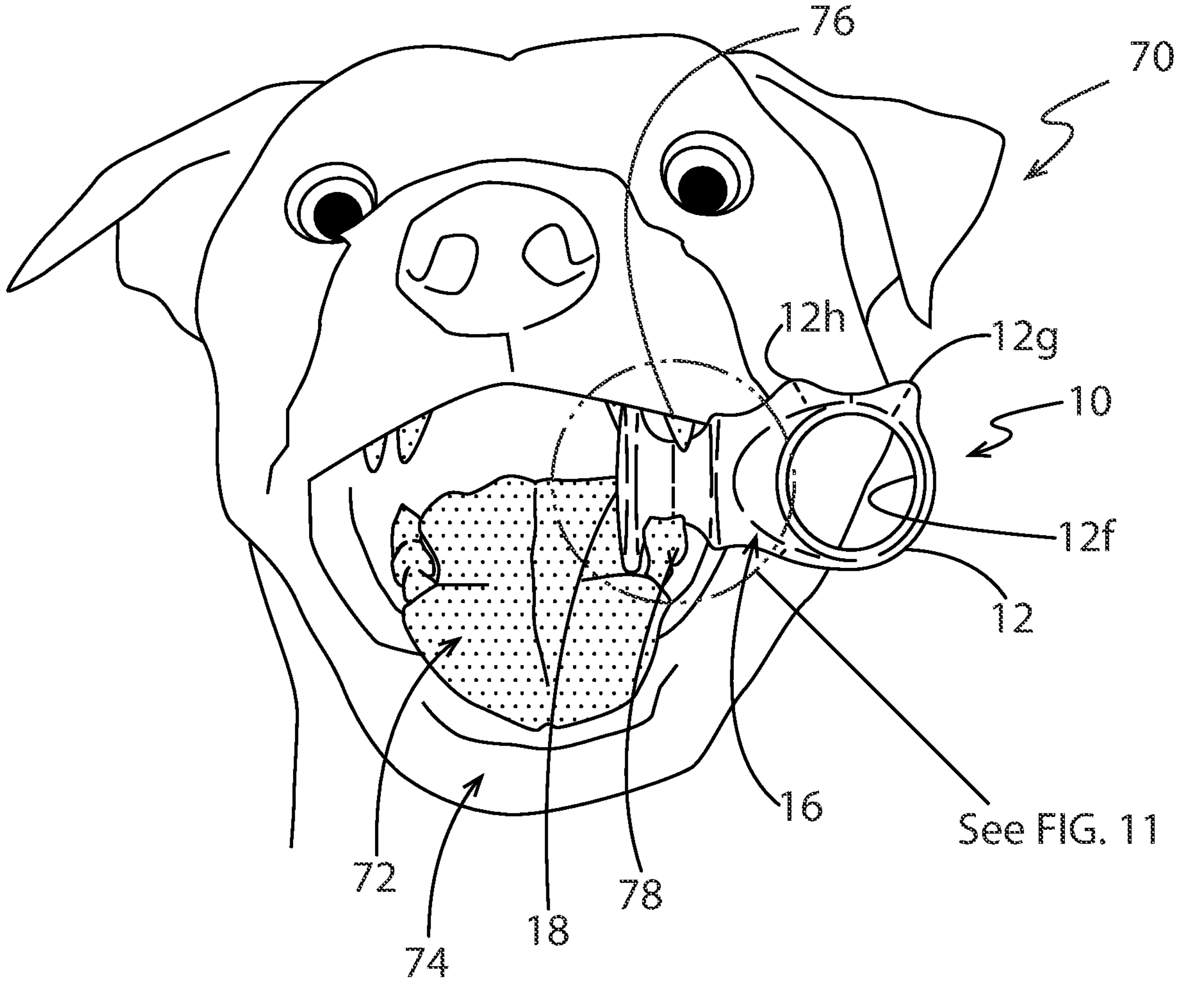
FIG. 10 is a front elevation view of the bite block of FIG. 1 held between a dog's teeth after insertion into a left-hand-side of the dog's mouth; the person's hand is not illustrated in this figure for clarity of illustration.

First bottom portion 12*c* opposite the indentation 12*j* is convexly curved and, as described earlier herein, is of a substantially constant radius of curvature. First bottom portion 12*c* therefore presents a comfortable surface against which the person's ring finger 58 and little finger 60 may rest when the middle finger 56 is inserted through aperture 12*f*. Gripping region 12 is therefore stably engaged by a single hand of a person, such as the person's right hand 50 illustrated in FIG. 9. It will be understood, however, that bite block 10 is completely reversible and may instead be engaged with the person's left hand. The particular hand the person selects for use may be based on what side of the animal's mouth the bite block 10 is to be positioned. For example, FIG. 9 shows the bite block 10 engaged with the person's right hand 50 and the bite block 10 is positioned within the right side of the animal's mouth. FIG. 10 shows the bite block 10 positioned within the left side of the animal's mouth. In this instance, bite block 10 may be engaged with the person's left hand. The configuration of the gripping region 12 leaves the person's thumb 52 free to rest upon a top region or side region of an animal's face and additionally leaves the person's ring finger 58 and little finger 60 free to rest under the animal's lower jaw. The person will simply swap the bite block 10 from one hand to the other when the wish to change the side of the animal's mouth within which to position the bite block 10.

FIG. 2 shows that bite block 10 is of a maximum height "H1" measured between an uppermost part of first projection 12*g* and second projection 12*h*, and the lowermost part of first bottom portion 12*c*. In one embodiment, the height "H1" is approximately 1.5 inches in height. FIG. 4 shows that first front portion 12*a* and first region portion 12*b* are located a width "W1" apart from each other proximate end wall 12*e*. In bite block 10, width "W1" is approximately 0.5 inches. First front portion 12*a* and first rear portion 12*b* flare outwardly away from one another moving longitudinally away from end wall 12*e* and towards right end 10*f* of bite block 10. Transition region 16 is continuous with gripping region 12 and the second front portion 16*a* and second rear portion 16*b* (which are continuous with first front portion 12*a* and first rear portion 12*b*, respectively) continue to flare outwardly away moving in a direction from end wall 12*e* towards right end 10*f* of bite block 10. When bite block 10 is viewed from above, as in FIG. 4, the first top region 12*b* and second top region 16*b*, together, are a truncated "V-shape". Similarly, when bite block 10 is viewed from below, as in FIG. 5, the first bottom region 12*d* and second bottom region 16*d*, together, are of a truncated "V-shape". Second front portion 16*a* and second rear portion 16*b* are substantially continuous with the parts of first front portion 12*a* and first rear portion 12*b* that form part of the circumferential wall 12*f* that bounds and defines aperture 12*f*.

Bite receiving region 14 is continuous with transition region 16 and terminates in a lingual plate 18. Bite block 10 is of its greatest width "W2" where bite receiving region 14 begins to extend outwardly from transition region 16 and towards right end 10*f*. The width "W2" is identified in FIG. 4 as being measured from second front portion 16*a* to second rear portion 16*b*. The width "W2" is approximately 1 inch in bite block 10.

Second top portion 16*c* of transition region 16 is continuous with and extends downwardly from second projection 12*h* of gripping region 12 and towards bite receiving region 14. First top portion 16*c*, as seen in FIG. 2, curves concavely downwardly from second projection 12*h*. Second bottom portion 16*d* of transition region 16 is continuous with and extends upwardly from first bottom portion 12*d* of gripping region 12 and towards bite receiving region 14. Second bottom region 16*d* is also concavely curved but the radius of curvature of second top portion 16*c* is smaller than the radius of curvature of second bottom portion 16*d*. As shown in FIG. 2, the configuration of transition region 16*c* is such that the vertical distance between second top portion 16*c* and second bottom portion 16*d* decreases moving in a direction away from left end 10*e* of bite block 10 and towards right end 10*f* thereof. The vertical distance between second top portion 16*c* and second bottom portion 16*d* is at its smallest proximate where transition portion 16 meets biting portion 14. This smallest height of transition region 16 is indicated by the height "H2" in FIG. 2. In one embodiment, the height "H2" is approximately 1 inch.

An annular boss 16*e* is defined where bite receiving region 14 extends outwardly from transition region 16.

As best seen in FIG. 2, bite receiving region 14 extends outwardly from transition region 16 in a direction moving away from left end 10*e* towards right end 10*f* of bite block 10, and terminates in a lingual plate 18. Lingual plate 18 is of a height "H3" that is smaller than the height "H2" of the transition region 16 at annular bot 16*e*. An annular groove 14*e* is defined in bite receiving region 14 and this annular groove 14*e* is formed third front portion 14*a*, third rear portion 14*b*, third top portion 14*c*, and third bottom portion 14*d* dropping off steeply from the annular boss 16*e* of transition region 16 and then rising again to form lingual plate 18. Lingual plate 18 has a circumferential wall 18*a* which circumscribes the longitudinal axis Z-Z and forms an annular detent that is located opposite annular boss 16*e*. The sharply, U-shaped curve of the annular groove 14*e* forms an upper trough 20 along third top portion 14*c* of bite receiving region between boss 16*e* and the annular detent 18*a* of lingual plate 18. The sharply U-shaped curve of the annular groove 14*e* forms a lower trough 22 along third bottom portion 14*c* between boss 16*e* and annular detent 18*a* of lingual plate 18. Upper trough 20 is configured to receive one or maxillary teeth of an animal therein. The maxillary teeth are the teeth on the animal's upper jaw. Lower trough 22 is configured to receive one or more mandibular teeth of the animal therein. The mandibular teeth are the teeth on the animal's lower jaw.

In additional to circumferential wall 18*a*, lingual plate 18 also includes an end wall 18*b* that forms the right end 10*f* of bite block 10. End wall 18*b* is convexly curved. In particular, end wall 18*b* has a large radius of curvature and the wall is therefore gently curved. In other embodiments (not shown herein), end wall 18*b* may be planar in nature or even concavely curved. Lingual plate 18, and particularly the end wall 18*b* thereof, is configured to contact the tongue of an animal when bite block 10 is inserted into the animal's mouth. Lingual plate 18 is configured to allow the animal's tongue to assume a substantially natural position in the animal's mouth. In other words, the lingual plate 18 is not configured in such a way that it will apply a lateral pushing force on the animal's tongue and thereby keep it in an unnatural position within the animal's mouth when bite block 10 is used.

Figure 6:
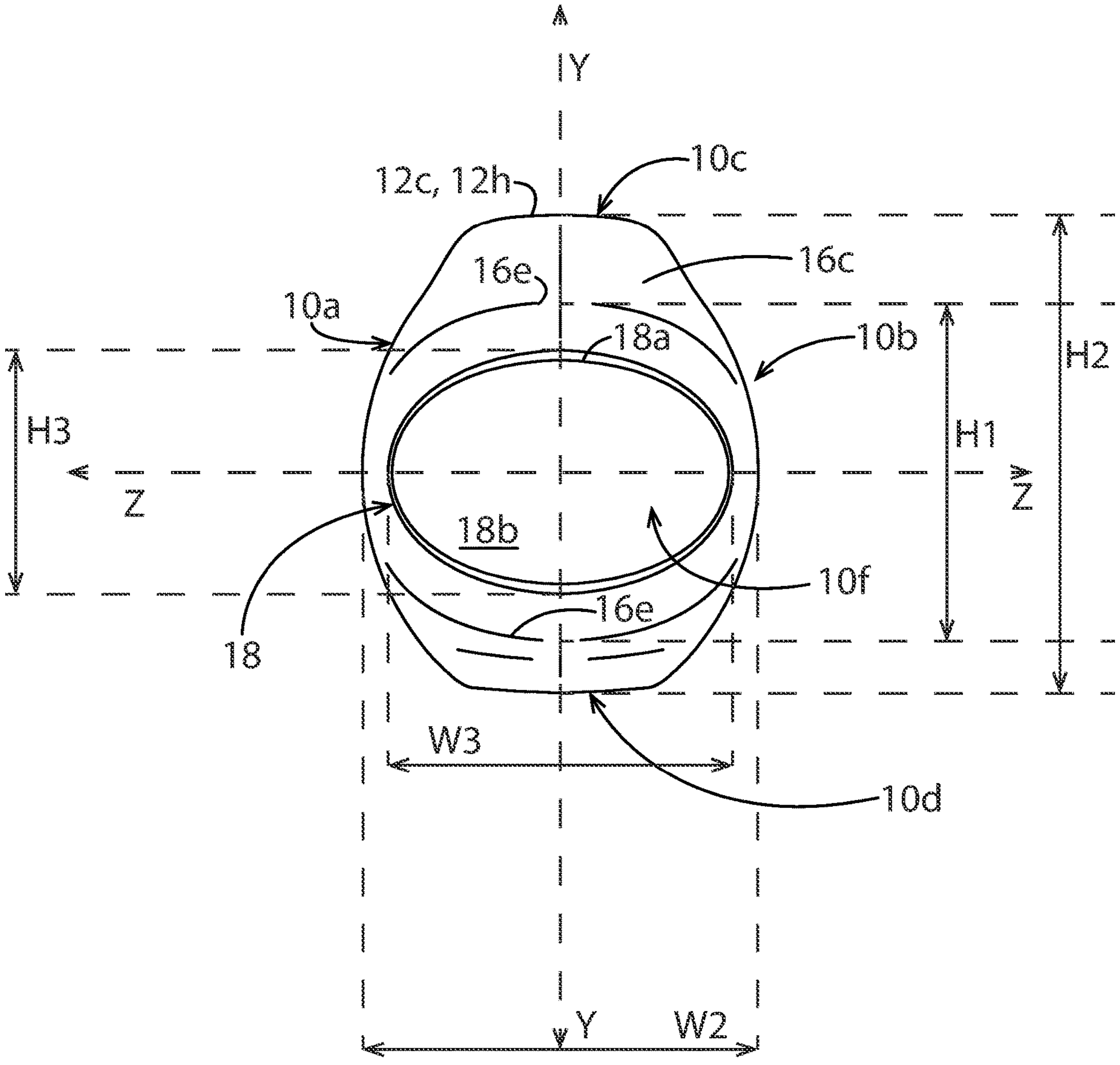
FIG. 6 is right end elevation view of the bite block of FIG. 1.
Figure 7:
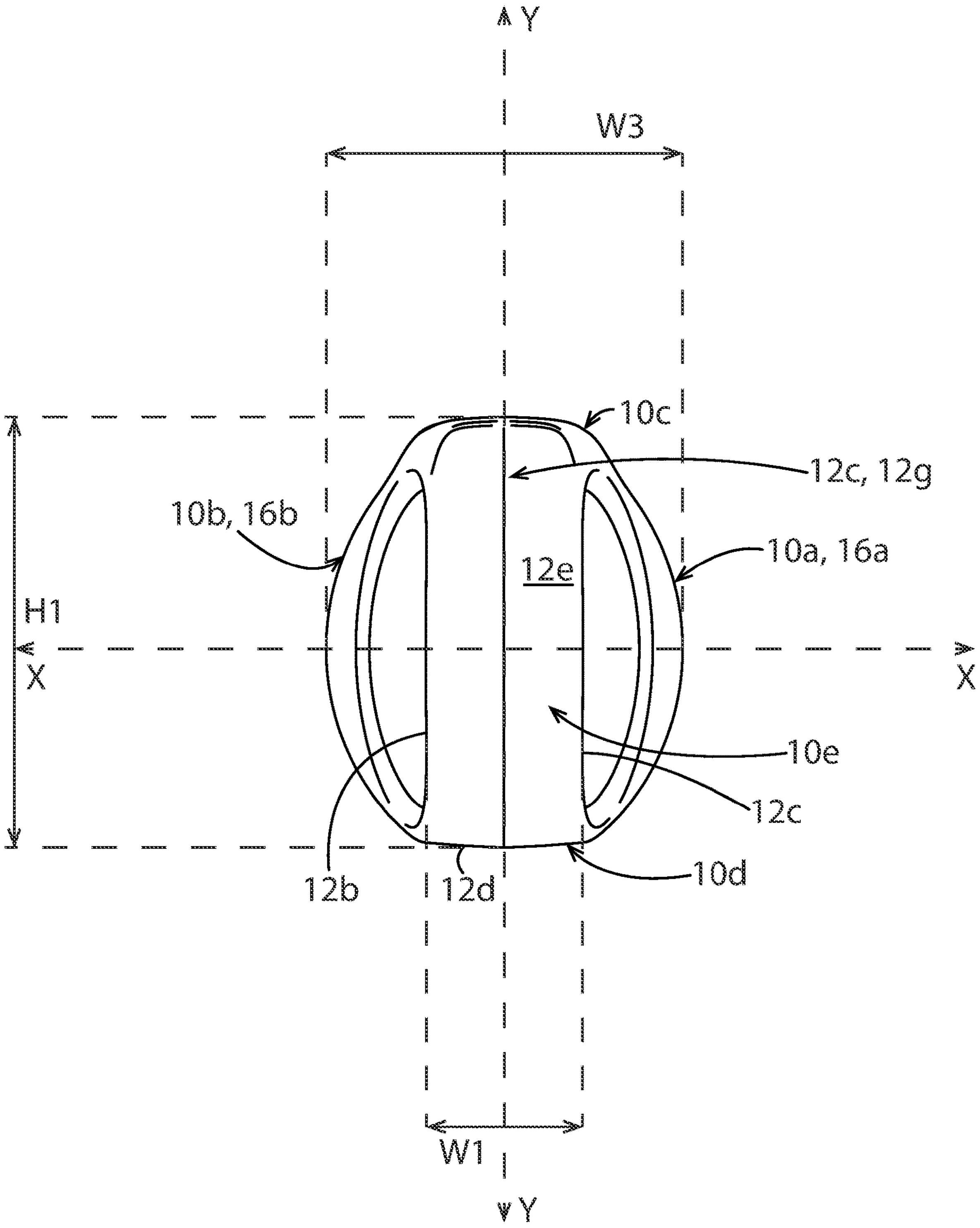
FIG. 7 is a left end elevation view of the bite block of FIG. 1.

As best seen in FIG. 6, end wall 18*b* is generally elliptical in shape and therefore circumferential wall 18*a* is also generally elliptical in shape. Lingual plate 18 is of a height "H3" and of a width "W3", where the height "H3" is measured in the vertical direction, and the width "W3 is measured in the lateral or transverse direction. Width "W3" is approximately 1.25 inches in bite block 10. Height "H3" is approximately 1.25 inches in bite block 10. As is evident from FIG. 6, the height "H3" of lingual plate 18 is smaller than the maximum height "H1" of the gripping region 12, measured at second projection 12*h*. The height "H3" of lingual plate 18 is also smaller than the height "H1" of the transition region 16 measured at the annular boss 16*e*. FIG. 2 identifies the height "H4" of bite receiving region 14, where this height represents the vertical distance measured where the third top portion 14*c* and third bottom portion 14*d* are closest to one another in the annular groove 14*e*. The height "H4" of the bite receiving region 14 in the annular groove 14*e* is smaller than the height "H3" of the lingual plate 18.

FIG. 6 shows that the width "W3" of lingual plate 18 is greater than the height "H3" thereof. Additionally, width "W3" of lingual plate 18 is smaller than the width "W2" of the transition region 16 proximate annular boss 16*e*. Still further, width "W3" of lingual plate 18 is greater than the width "W4 of the annular groove 14*e* defined in bite receiving region 14 and measured between third front portion 14*a* and third rear portion 14*b*. FIG. 4 shows that the width "W4" of biting portion 14 in annular groove 14*e* is of substantially the same width as width "W1" of the narrowest part of the gripping region 12 proximate left end 10*e* of bite block 10. Width "W4" is approximately 0.5 inches in bite block 10.

Referring to FIGS. 2 and 4, bite block 10 is over an overall length "L" from left end 10*e* to right end 10*f*. Gripping region 12 is of a length "L1" from left end 10*e* to a downslope of second projection 12*h*, transition region 16 is of a length "L2" from the downslope of second projection 12*h* to annular boss 16*e*, and bite receiving region 14 is of a length "L3" from the annular boss to right end 10*f* of the bite block 10. In bite block 10, length "L" is approximately 2 inches, "L1" is approximately 0.875 inches, "L2" is approximately 0.625 inches; and "L3" is approximately 0.5 inches.

Referring to FIGS. 8 through 11, bite block 10 is used in the following manner. The person will first decide which side of the animal's mouth in which they need to engage bite block 10. FIG. 9 shows bite block 10 inserted into a right-hand side of the mouth of a dog 70. FIG. 10 shows bite block 10 inserted into a left-hand side of the mouth of a dog 70. If, for example, the person decides to insert the bite block 10 into the right-hand side of the dog's mouth (as in FIG. 9), then they will insert the middle finger 56 of their right hand 50 through the aperture 12*f* defined in the gripping region 12 of bite block 10. The middle finger 56 may be inserted through aperture 12*f* until it gripping region 12 is seated comfortably on the finger 56. For example, middle finger 56 may be inserted to the point that the gripping region 12 circumscribes the portion of the middle finger 56 located between the first and second finger joints, or between the second finger joint and the person's palm. The person will then place their index finger 54 in the indentation 12*j* of gripping region, i.e., on the outer surface of first top portion 12*c* of gripping region 12, between first projection 12*g* and second projection 12*h*. The person's ring finger 58 will placed in abutting contact with the first bottom portion 12*d* of gripping region 12. When bite block 10 is correctly engaged on the person's right hand 50, lingual plate 18 will be oriented generally parallel with the palm of the right hand.

The bite block 10 is then inserted into the right-hand side of the dog's mouth in such a way that the dog's tongue 72 is contacted by the end wall 18*b* of the lingual plate 18, the dog's maxillary teeth (i.e., teeth on the upper jaw) are received in the upper trough 20 of bite receiving region 14, and the dog's mandibular teeth (i.e., teeth on the lower jaw) are received in the lower trough 22 defined by bite receiving region 14. The maxillary teeth and mandibular teeth of the dog are not visible in FIG. 9.

The person will then place their ring finger 58 and little finger 60 (not shown in FIG. 9 but shown in FIG. 8) under the dog's lower jaw 74, and their thumb 52 on the dog's muzzle 80 (FIG. 9). This arrangement helps to steady the dog's head, and therefore their mouth, so that the person can perform a task, such as brushing the dog's teeth. In particular, the person can brush the dog's teeth on the opposite side of the dog's mouth from where the bite block 10 is engaged. The bite block 10 will keep the dog's upper and lower jaws sufficiently far enough apart for the person to perform a task like teeth brushing without fear of being bitten. It should be noted that the person is able to engage the bite block 10 in the dog's mouth and steady the dog's mouth once the bite block 10 is engaged, with a single hand. This leaves the person's other hand free to perform a task such as teeth brushing or administering medication to the dog. FIG. 9 shows that the person's right hand has installed the bite block 10 and is being used to steady the dog's mouth. This leaves the person's left hand free to perform the requisite task.

Figure 11:
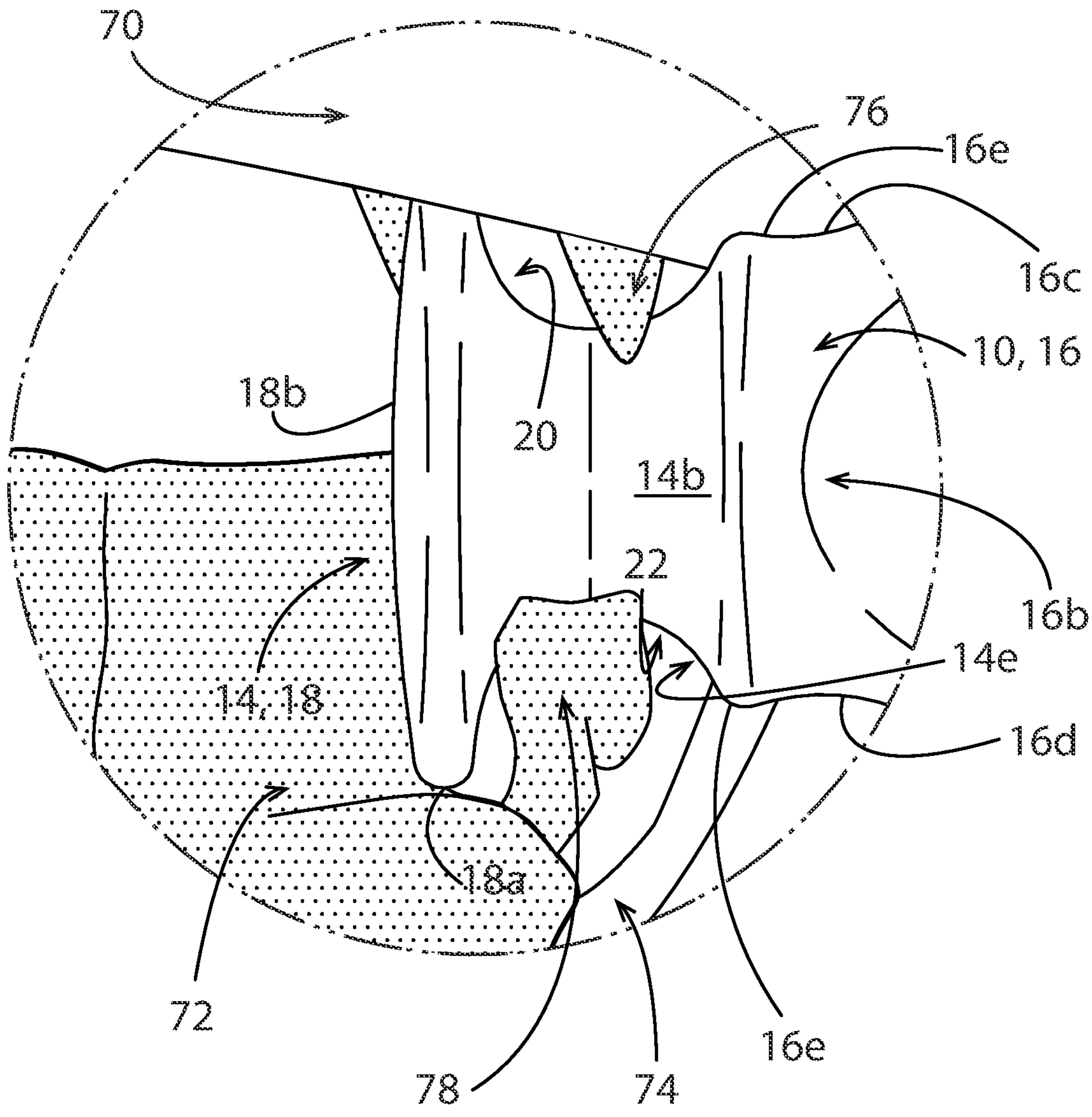
FIG. 11 is an enlarged front elevation view of the highlighted region of FIG. 10.

FIG. 10 shows a similar situation to FIG. 9 except, in this instance, the bite block 10 has been installed in the left-hand side of the dog's mouth. The person's left hand (which was used to install the bite block 10 and will also be used to steady the dog's mouth) is not shown in this view for clarity of illustration only. FIGS. 10 and 11 show that one or more of the dog's maxillary teeth 76 are received in the upper trough 20 of bite receiving region 14 and one or more of the dog's mandibular teeth 78 are received in the lower trough 22 of bite receiving region 14. The left side of the dog's tongue 72 contacts the end wall **18*b* of lingual plate 18** and is held in the dog's mouth in a substantially normal position.

Referring again to FIG. 10, it can be seen that the transition region 16 and gripping region 12 of bite block 10 extend outwardly for a distance from the dog's mouth. Transition region 16 effectively begins with the annular boss **16*e* and then flares outwardly to a maximum height "H1" and maximum width "W2" before continuing along the Z-Z longitudinal axis into gripping region 12. The flaring transition region 16 thereby forms a type of shield between the dog's mouth and the person's hand. The flaring transition region effectively acts as a spacer between the person using the bite block 10** and the dog's mouth.

When the person desires to remove the bite block 10 from the dog's mouth, they will simply remove their thumb 52, ring finger 58 and little finger 60 from contact with the dog's jaw. The dog likely will then open their mouth and, since the person still has their middle finger 56 inserted through aperture **12*f* in gripping region 12, the person will be able to remove the bite block 10 from the dog's mouth. If the person is brushing the dog's teeth, for example, they will then remove the bite block from their hand, the right hand for example, and engage the bite block 10 on their other hand, i.e., their left hand, in the manner described earlier herein. Using their left hand, the person will then install the bite block 10 in the other side of the dog's mouth and steady the dog's mouth with their left hand. The person will grasp a pet toothbrush in their right hand and will perform the tooth brushing task on the right-hand side of the dog's mouth. Once the teeth on both sides of the mouth have been brushed, the bite block 10 will be removed from the person's hand. The bite block 10 may then be sterilized for use at another time. If the bite block 10 is beginning to deteriorate from use, then the person will throw the bite block 10** away.

Figure 12:
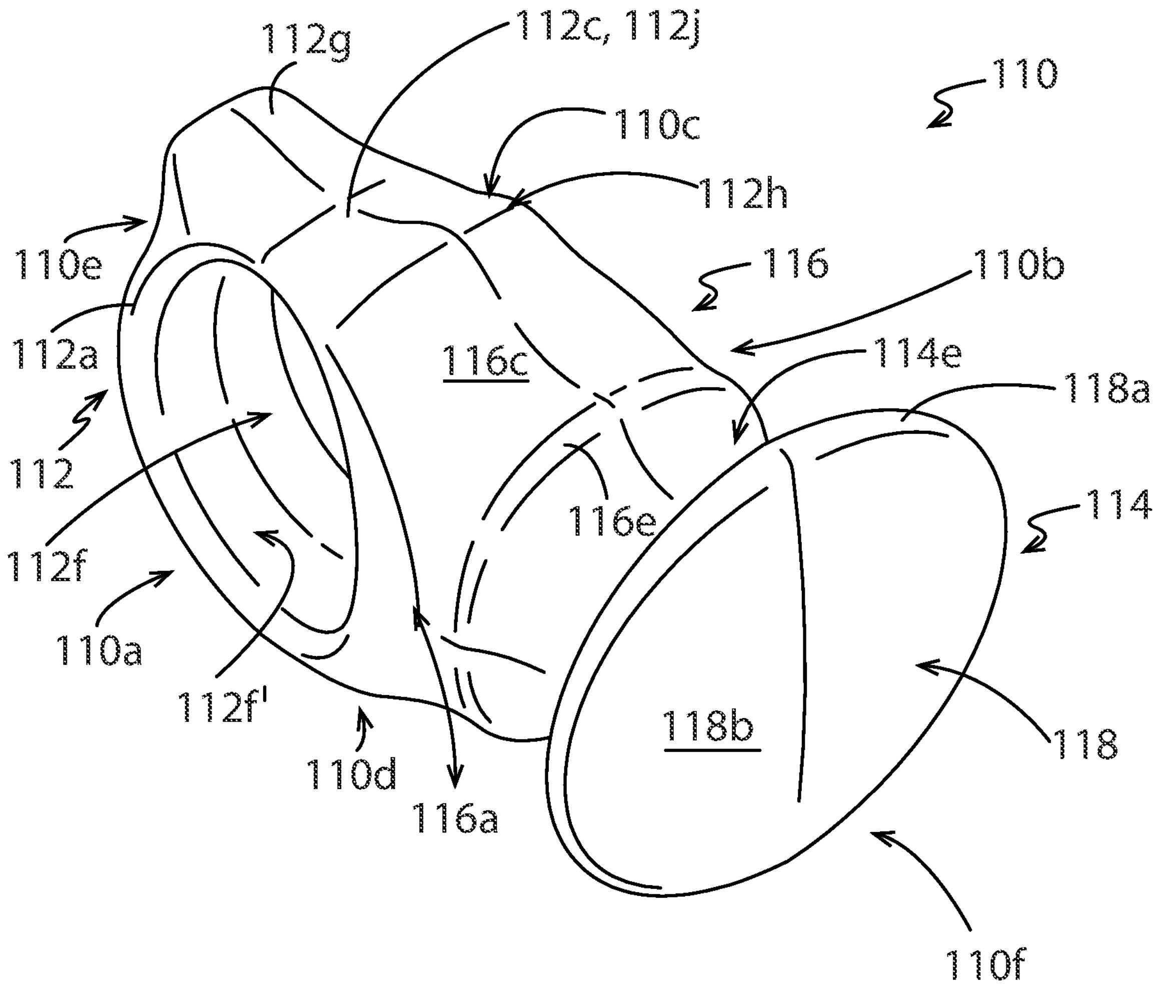
FIG. 12 is a front, top, right end isometric perspective view of a second embodiment of a bite block in accordance with an aspect of the present disclosure.

Referring now to FIGS. 12 through 18, a second embodiment of a bite block in accordance with the present disclosure is illustrated, generally indicated at 110. Bite block 110 is substantially identical to bite block 10 except for specific features therefore which will be described in greater detail below. Bite block 110 includes a gripping region 112, a bite receiving region 114, and a transition region 116 that is interposed between gripping region 112 and bite receiving region 114. Bite block 110, as indicated in FIG. 12, comprises a body having a front **110*a*, a back 110*b*, a top 110*c*, a bottom 110*d*, a left end 110*e*, and a right end 110*f*. A transverse axis "X-X" (FIG. 15) extend between front 110*a* and back 110*b* and defines a lateral or transverse direction therebetween. A vertical axis Y-Y (FIG. 13) extends between top 110*c* and bottom 110*d* and defines a vertical direction therebetween. A longitudinal axis Z-Z (FIG. 13) extends between left end 110*e* and right end 110*f*** and defines a longitudinal direction therebetween. Transverse axis X-X and vertical axis Y-Y are oriented at right angles to one another. Transverse axis X-X and longitudinal axis Z-Z are oriented at right angles to one another. Vertical axis Y-Y and longitudinal axis Z-Z are oriented at right angles to one another.

Gripping region 112 and transition region 116 are substantially identical in all aspects to gripping region 12 and transition region 16 of bite block 110 and therefore will not be discussed in further detail herein other than to identify the various surfaces thereof. Gripping region 112 includes a first front portion **112*a*, a first rear portion 112*b*, a first top portion 112*c*, and first bottom portion 112*d*, and an end wall 112*e*. An aperture 112*f* is defined by an interior wall 112*f* of gripping region 112 and aperture 112*f* extends between first front portion 112*a* and first rear portion 112*b*. First top portion 112*c* defines a first projection 112*g* and a second projection 112*h* that are separated from one another by an indentation 112*h*. These component parts of gripping region 112 are substantially identical to the component parts of gripping region 12 of bite block 10 in all aspects and dimensions. Gripping region 112 is utilized in bite block 110 in a substantially identical manner to the manner gripping region 12 is utilized in bite block 10**.

Transition 116 is substantially identical to transition region 16 of bite block 10 in all aspects and dimensions and is utilized in a substantially identical manner to transition region 16. Transition region 116 includes a second front portion **116*a*, a second rear portion 116*b*, a second top portion 116*c*, a second bottom portion 116*d*, and transition region 114 extends outwardly from an annular boss 116*e* that is substantially identical to boss 16*e* of transition region 16 of bite block 10**.

Bite block 110 differs from bite block 10 with respect to the configuration of the bite receiving region 114. Bite block 110 is configured to be particularly useful with larger animals than is bite block 10. As a consequence, the parts of the bite receiving region 114 that will be inserted into the larger animal's mouth are of greater dimensions to help ensure that the animal is less likely to be able to bite through the bite receiving region 114 while bite block 110 is in use.

Bite receiving region 114 of bite block 116 includes a third front portion **114*a*, a third rear portion 114*b*, a third top portion 114*c*, and a third bottom portion 114*d*. The third front portion 114*a*, third top portion 114*c*, third rear portion 114*b*, and third bottom portion 114*d* drop off sharply from annular boss 116*e* of transition region 116, defining an annular groove 114***e* and then flaring outwardly to form lingual plate 118. Lingual plate 118 is elliptically shaped when bite block 116 is viewed from the right (as in FIG. 17). Lingual plate 118 includes a circumferential wall 118*a* that forms an annular detent that is opposed across the annular groove 114*e* from annular boss 116*e*. Lingual plate 118 further includes an end wall 118*b* that comprises the right end 110*f* of bite block 110.

Figure 13:
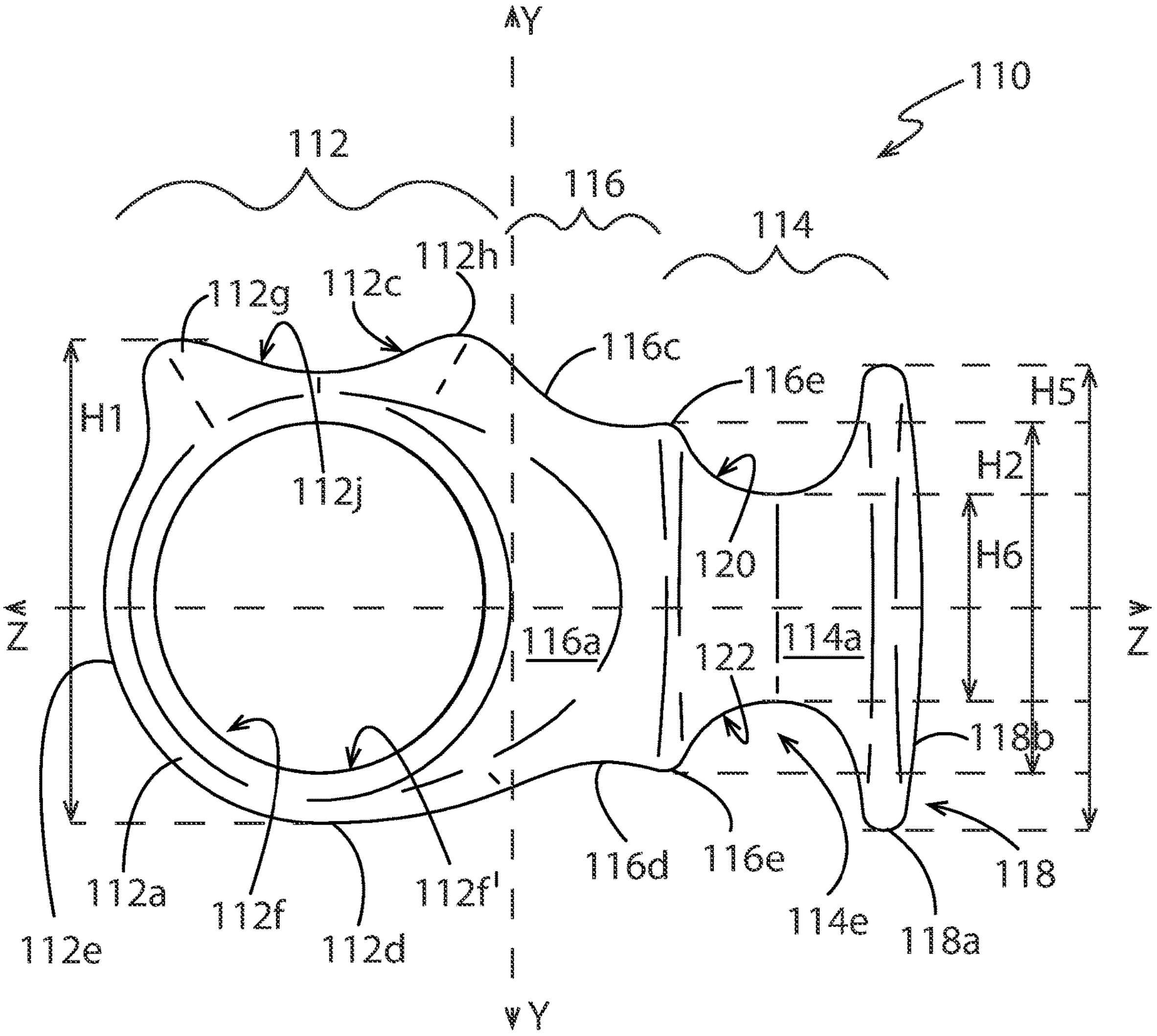
FIG. 13 is a front elevation view of the bite block of FIG. 12.
Figure 14:
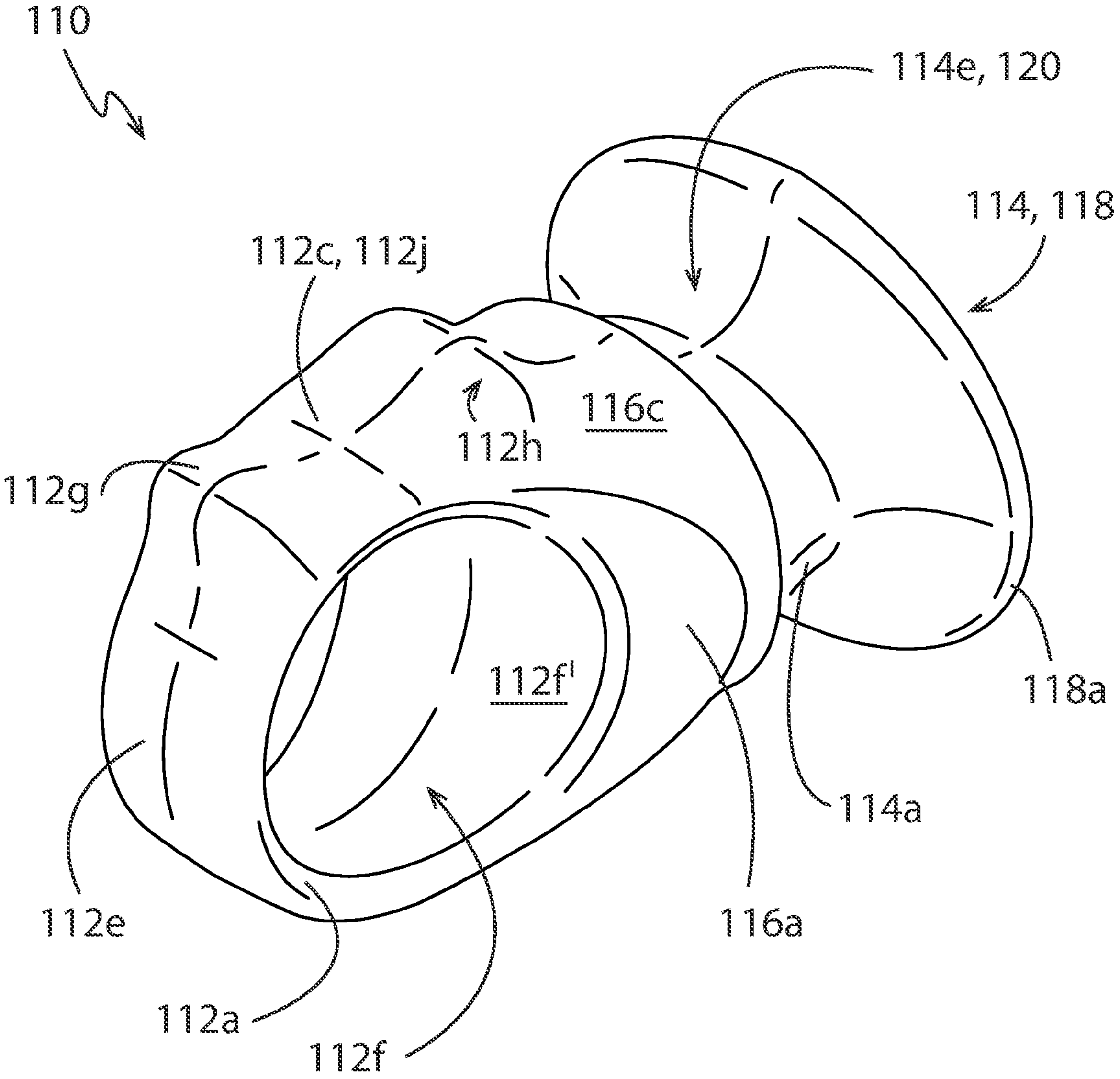
FIG. 14 is a rear elevation view of the bite block of FIG. 12.

Unlike in bite receiving region 14 of bite block 10, in bite receiving region 114 the lingual plate 118 is both wider and taller in height than the annular boss 116*e* of transition region 116 instead of being of a lesser width and height. As best seen in FIG. 13, the maximum height of the gripping region 112 (like gripping region 12 of bite block 10 is a height "H1", measured from an uppermost end of second projection 112*h* to a lowermost surface of first bottom portion 112*d*. In one embodiment, the height "H1" is approximately 1.25 inches. The circumferential wall 118*a* of lingual plate 118 is of a height "H5" that is slightly smaller than the height "H1". In one embodiment, the height "H5" is approximately 1.3 inches. The height of the annular boss 116*e* of transition region, like the annular boss 16*e* of bite block 10, is of a height "H2". The height "H2" of annular boss 116*e* is smaller than the height "H5" of lingual plate 118. In bite block 10, the height "H2" of the annular boss 16*e* is greater than the height "H3" of the lingual plate 18 (as seen in FIG. 2). In one embodiment, the height "H2" is approximately 1 inch.

It should additionally be noted that the height of the bite receiving region 114 in the annular groove 114*e* (between the upper trough 120 and lower trough 122) is indicated as a height "H6". This height "H6" is smaller than the height "H2" of the annular boss 116*e* of transition region 116 but is greater than the height "H4" of the bite receiving region 14 in the annular groove 14*e* of bite block 10. In bite block 110, the height "H6" is approximately 0.75 inches while the height "H2" is approximately 1 inch and the height "H4" is approximately 0.5 inches. The differences in height of the various portions of the bite block 110 relative to the bite block 10 can readily be seen by comparing FIG. 13 with FIG. 2.

Figure 15:
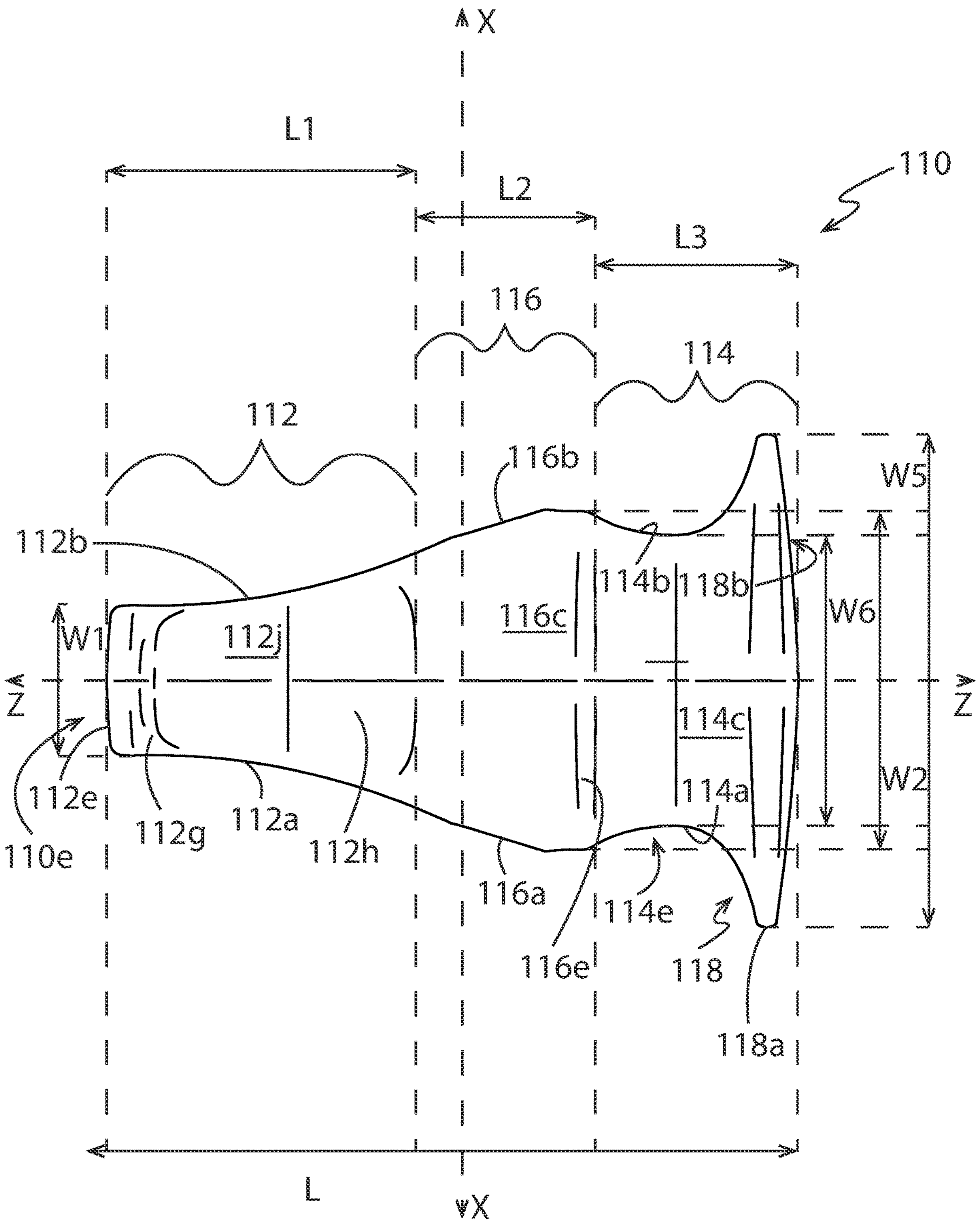
FIG. 15 is a top plan view of the bite block of FIG. 12.
Figure 16:
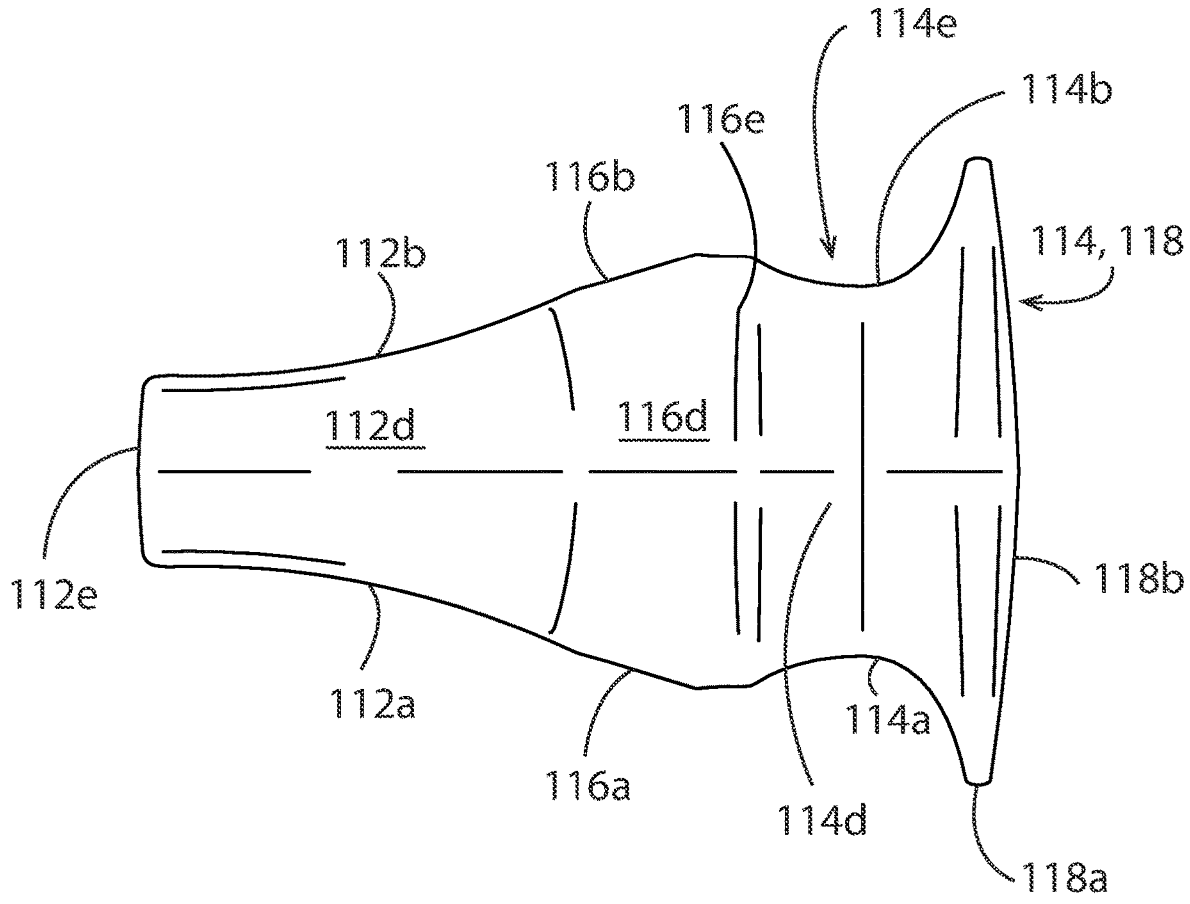
FIG. 16 is a bottom plan view of the bite block of FIG. 12.
Figure 17:
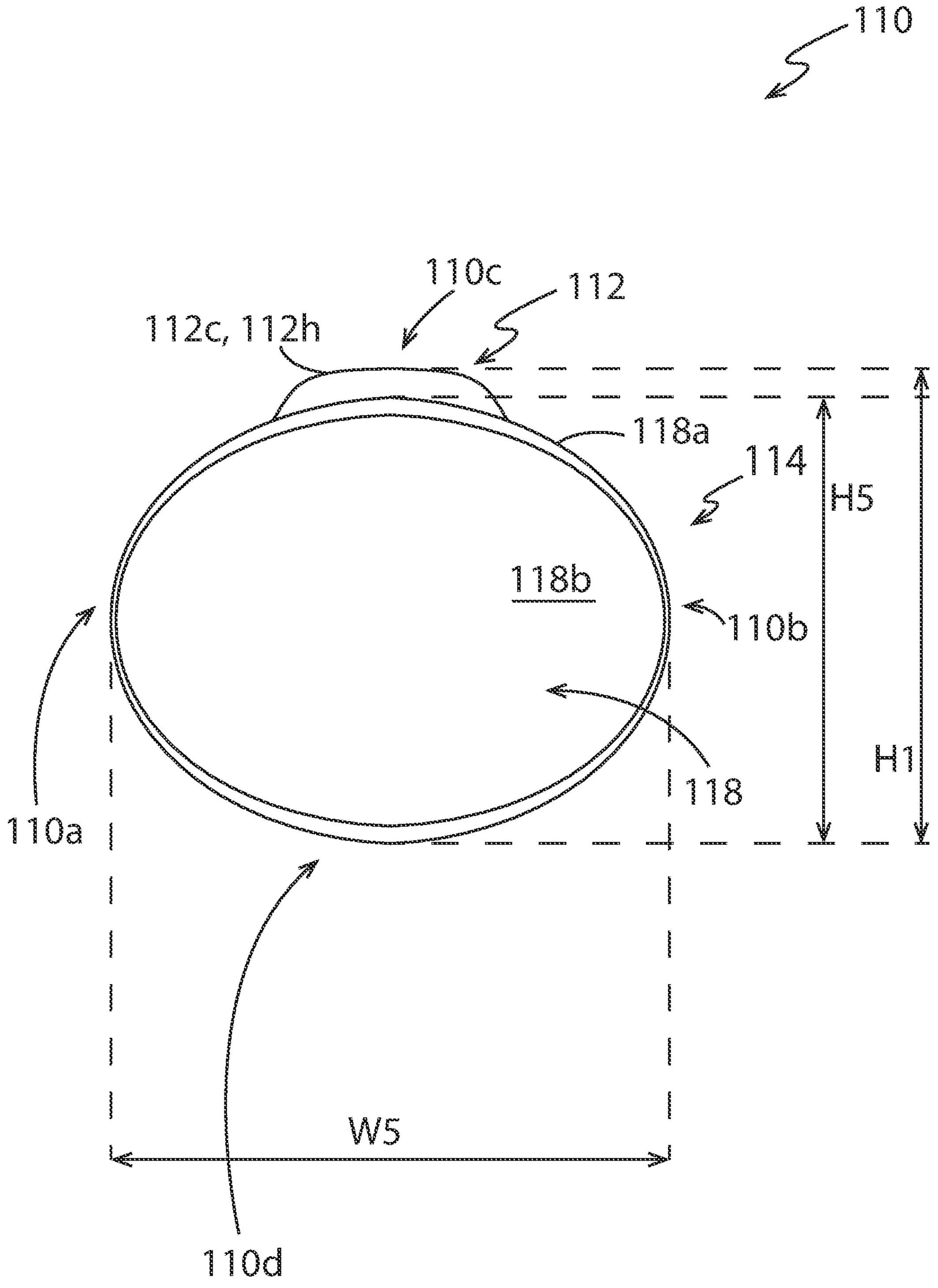
FIG. 17 is right end elevation view of the bite block of FIG. 12.
Figure 18:
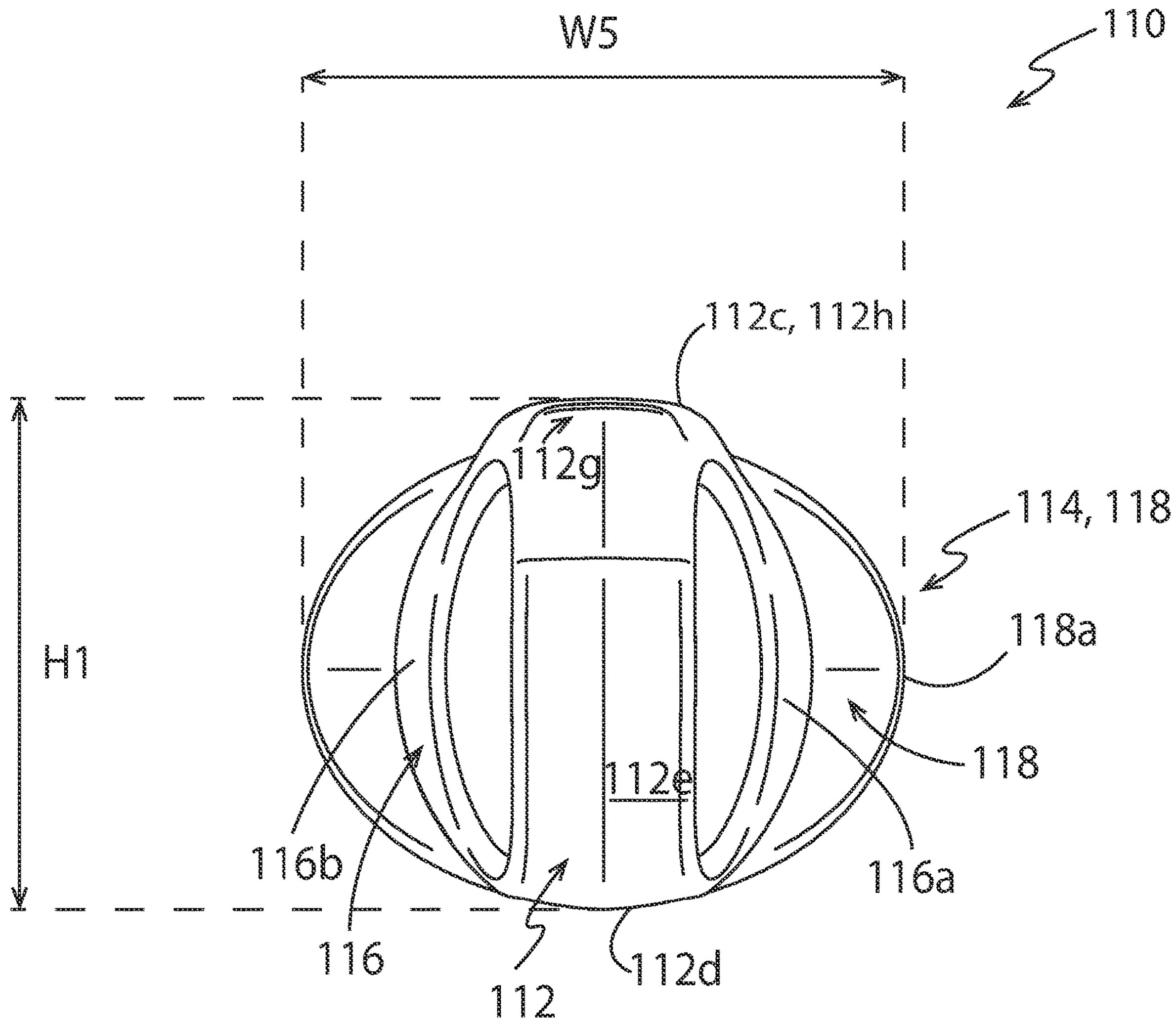
FIG. 18 is a left end elevation view of the bite block of FIG. 13.

Referring now to FIG. 15, the width of the end of gripping region 112 proximate left end 110*e* of bite block 110 is indicated as "W1". This is the same width as the end of the gripping region 12 proximate left end 10*e* of bite block 10. Similarly, the width of the annular boss 116*e* is indicated as "W2", which is the same width as the width "W2" of the annular boss 16*e* of bite block 10. The width "W2" is approximately 1 inch in bite block 110. The width of the lingual plate 118 is indicated as "W5". Width "W5" is larger than the widest portion of the transition region 116, which is the width of the annular boss 116*e*, i.e., width "W2". In bite block 10, the width of the annular boss 16*e* is the widest portion of the bite block 10. In bite block 110 the widest portion thereof is the width of lingual plate 118. This difference can clearly be seen by comparing FIG. 15 with FIG. 6. In bite block 110, the width "W5" is approximately 1.5 inches while in bite block 10, the width "W2" is approximately 1 inch.

Referring again to FIG. 15, the width of the bite receiving region 114 in the innermost surfaces of the annular groove 114 between third front portion 114*a* and third rear portion 114*b* is indicated as the width "W6". Width "W6" is smaller than the width "W2" of annular boss 116*e* of transition region 116. Width "W6", however, is substantially larger than the width "W4" of the same part of the bite receiving region 14 in bite block 10. Width "W6" is approximately 0.875 inches in bite block 110 while width "W4" of bite block 10 is approximately 0.5 inches.

Referring to FIGS. 2 and 4, bite block 110 is over an overall length "L" from left end 110*e* to right end 110*f*. Gripping region 112 is of a length "L1" from left end 110*e* to a downslope of second projection 112*h*, transition region 116 is of a length "L2" from the downslope of second projection 112*h* to annular boss 116*e*, and bite receiving region 114 is of a length "L3" from the annular boss to right end 10*f* of the bite block 110. In bite block 110, length "L" is approximately 2 inches, "L1" is approximately 0.875 inches, "L2" is approximately 0.625 inches; and "L3" is approximately 0.5 inches.

Bite block 110 is used in a substantially identical manner to bite block 10 and so the method of use of bite block 110 will not be further described herein. However, because of the increased circumferential diameter (encompassing height "H6" and width "W6") of the bite receiving region 114 in the annular groove 114*e*, relative to the same region in bite block 10, bite block 110 is particularly usefully for larger breeds of dogs, for example. Larger breed dogs have larger mouths and larger teeth and might therefore be able to bite through the reduced dimension bite receiving region 10 of bite block 10. Furthermore, the larger surface area presented by the lingual plate 118 of bite block 110 helps to correctly and naturally position the tongue of a larger breed dog.

A method of installing a bite block 10 or 110 in an animal's mouth will now be generally discussed. The method will be described primarily with reference to bite block 10 but applies equally to bite block 110. The method includes providing a bite block 10 with a body having a gripping region 12 at a first end 10*e* and a bite receiving region 14 at a second end 10*f*, and a longitudinal axis Z-Z extending between the first end 10*e* and the second end 10*f*; inserting a first digit 56 of a person's hand 50 through an aperture 12*f* defined in the gripping region 12. The aperture 12*f* is oriented transverse to the longitudinal axis Z-Z (or parallel to the transverse axis X-X). The indentation 12*j* is located a distance vertically above the aperture 12*f* (and may be aligned therewith). It should also be noted that the second digit 54 of the person's hand 50 is kept from slipping out of the indentation 12*j* by two projections 12*g*, 12*h* which flank the indentation 12*j*. The projections 12*g*, 12*h* and indentation are all oriented transversely or generally transversely relative to longitudinal axis Z-Z of the bite block 10. The method further may include resting a second digit 54 of the person's hand 50 in an indentation 12*j* defined in a top 10*c* of the body in the gripping region 12

The method further includes providing a lingual plate 18 on the bite receiving region 14 of the body, wherein the lingual plate 18 is oriented generally transversely with respect to the longitudinal axis Z-Z of the body; orienting the lingual plate 18 generally parallel to a palm of the person's hand (not shown); and inserting the lingual plate 18 into the animal's mouth. The lingual plate 18 is inserted between the animal's upper jaw and lower jaw and is moved inwardly to the point that the annular groove 14*e* is generally aligned with one or more maxillary teeth 76 (FIG. 11) of the animal's upper jaw and with one or more mandibular teeth 78 (FIG. 11) of the animal's lower jaw. The lingual plate 18 is moved inwardly into the animal's mouth in such a way that the generally-vertically-oriented, vertical end wall 18*b* of the lingual plate 18 contacts the animal's tongue 72, particularly a side edge of the animal's tongue. The rounded elliptical circumferential surface 18*a* will contact the soft upper pallet on the animal's upper jaw and will contact the soft lower pallet on the animal's lower jaw. The rounded, smooth contours of the surface 18*a* and the overall elliptical shape of the lingual plate 18 helps to ensure that the bite block 10 is able to be seated comfortably in the animal's mouth. The elliptical shape of lingual plate 18, which is of a smaller height than width) is such that the vertical end wall 18*b* does not force the animal's mouth open to an uncomfortable degree. Furthermore, the elongated width of the lingual plate 18 ensures good contact between the tongue 72 and the lingual plate 18 and allows the animal's tongue to assume a generally natural position within the animal's mouth.

When the lingual plate 18 is in contact with the tongue 72, the one or more maxillary teeth 76 are seated in the upper trough 20 of bite block 10, and the one or more mandibular teeth 78 are seated in the lower trough 22 of bite block 10, the person may position the rest of the same hand 10 on parts of the animal's head to hold the head in a stable position. In use, the person will preferably insert their middle finger 56 through aperture 12*f* and will rest their index finger 54 in the indentation 12*j*. However, in other instances, if the person finds it more comfortable, they can insert their index finger 54 through the aperture 12*f* and position the middle finger 56 in abutting contact with the convexly-curved bottom surface 12*d* of gripping region 12. In other instances, the person may insert their ring finger 58 through the aperture 12*f* and place one or both of their index and middle fingers 54, 56 in the indentation 12*j*. The inserting of the first digit 56 of the person's hand 50 into the aperture 12*f* includes orienting the first digit 56 generally perpendicular to the longitudinal axis Z-Z of the body (i.e., parallel to transverse axis X-X). The method further comprises orienting the first digit 56 of the person's hand 50 generally parallel to the lingual plate 18 of the bite block, particularly with respect to the end wall 18*b*. The inserting of the first digit 56 of the person's hand is preceded by selecting an appropriately-sized bite block, i.e., 10 or 110, based on a size of the mouth of the animal into which the bite block is to be inserted.

The method may further comprise placing a thumb 54 of the person's same and on the animal's muzzle 80 (FIG. 9); placing one or both of a third digit 58 and a fourth digit 60 in contact with the bottom surface 12*d* of the gripping region and subsequently under the animal's lower jaw 74; holding the animal's head stably between the thumb 52, the third digit 58, and the fourth digit 60 of the person's same hand 50 while keeping the bite block 10 in place. The person is then able to use their other hand (i.e., one that does not contact bite block 10) to perform a task in the animal's mouth. For example, the person may brush the animal's teeth or administer medication to the animal. In one embodiment the method may further comprise flaring the front, the back, a top, and a bottom of the body outwardly in a direction moving longitudinally away from the first end of the body and towards the bite receiving region, and shielding the person's first digit and second digit from accidentally being bitten with the flaring front, back, top, and bottom of the body.

It will be understood that the various heights, widths, and lengths of the different parts of the gripping region 12, 112, bite receiving region 14, 114, transition region 16, 116, lingual plate 18, 118, and bite block body 10, 110 may be different from the approximate measurements provided herein. The bite blocks 10, 110 may be made smaller or larger than the dimensions disclosed herein.

It will further be understood that the indentation 12*j*, 112*j*, the first and second projections 12*g*, 12*h*, 112*g*, 112*h*, and the annular groove 14*e*, 114*e* may be oriented at an angle other than ninety degrees relative to longitudinal axis Z-Z in a similar fashion. Similarly, gripping region 12, 112 and/or lingual plate 18, 118 may be oriented at an angle other than ninety degrees relative to the longitudinal axis Z-Z. Still further, aperture 12*f*, 112*f* may be oriented at an angle other than ninety degrees relative to the longitudinal axis Z-Z.

While bite block 10, 110 has been described as being held and used by a user by inserting a digit through the aperture and resting another digit in the indentation on the top of the bite block, it will be understood that any other manner of holding the bite block 10, 110 in a user's hand and inserting the bite block into an animal's mouth may be utilized.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A bite block comprising:

a body having a front and an opposed back, a top and an opposed bottom, a first end and an opposed second end, wherein a longitudinal axis of the body extends between the first end and the second end;

a gripping region provided proximate the first end of the body and adapted to be engaged by a hand of a person;

a bite receiving region provided proximate the second end of the body and adapted to be received in a mouth of an animal;

an aperture defined in the gripping region, said aperture extending between the front and the back of the body and transverse to the longitudinal axis, said aperture being configured to receive a first digit of a person's hand therethrough;

an indentation defined in the top of the body in the gripping region, said indentation located a distance vertically above the aperture and adapted to receive a second digit of the person's hand therein; and wherein the indentation is oriented transverse to the longitudinal axis of the body.

2. The bite block according to claim 1, further comprising a transition region interposed between the gripping region and the bite receiving region.

3. The bite block according to claim 1, wherein the bite receiving region includes a lingual plate located at the second end of the body, and wherein the lingual plate is elliptical in shape when the body is viewed from the second end.

4. The bite block according to claim 3, wherein lingual plate is of a greater width than height, wherein the width is measured between the front and the back of the body and the height is measured between the top and the bottom of the body.

5. A bite block comprising:

a body having a front and an opposed back, a top and an opposed bottom, a first end and an opposed second end, wherein a longitudinal axis of the body extends between the first end and the second end;

a gripping region provided proximate the first end of the body and adapted to be engaged by a hand of a person;

a bite receiving region provided proximate the second end of the body and adapted to be received in a mouth of an animal;

an aperture defined in the gripping region, said aperture extending between the front and the back of the body and transverse to the longitudinal axis, said aperture being configured to receive a first digit of a person's hand therethrough;

an indentation defined in the top of the body in the gripping region, said indentation located a distance vertically above the aperture and adapted to receive a second digit of the person's hand therein; and wherein the indentation is flanked by a first projection and a second projection.

6. The bite block according to claim 5, further comprising a transition region interposed between the gripping region and the bite receiving region.

7. The bite block according to claim 5, wherein the bite receiving region includes a lingual plate located at the second end of the body, and wherein the lingual plate is elliptical in shape when the body is viewed from the second end.

8. The bite block according to claim 7, wherein lingual plate is of a greater width than height, wherein the width is measured between the front and the back of the body and the height is measured between the top and the bottom of the body.

9. A bite block comprising:

a body having a front and an opposed back, a top and an opposed bottom, a first end and an opposed second end, wherein a longitudinal axis of the body extends between the first end and the second end;

a gripping region provided proximate the first end of the body and adapted to be engaged by a hand of a person;

a bite receiving region provided proximate the second end of the body and adapted to be received in a mouth of an animal;

an aperture defined in the gripping region, said aperture extending between the front and the back of the body and transverse to the longitudinal axis, said aperture being configured to receive a first digit of a person's hand therethrough;

an indentation defined in the top of the body in the gripping region, said indentation located a distance vertically above the aperture and adapted to receive a second digit of the person's hand therein;

wherein the bite receiving region includes a lingual plate located at the second end of the body:

wherein the lingual plate is elliptical in shape when the body is viewed from the second end;

wherein the lingual plate is separated from the gripping region by an annular groove;

wherein a first region of the annular groove in the top of the body defines an upper trough and a second region of the annular groove in the bottom of the body defines a lower trough; and wherein when the bite receiving region is received in the mouth of the animal said upper trough receives one or more maxillary teeth therein and said lower trough receives one or more mandibular teeth therein.

10. A bite block comprising:

a body having a front and an opposed back, a top and an opposed bottom, a first end and an opposed second end, wherein a longitudinal axis of the body extends between the first end and the second end;

a gripping region provided proximate the first end of the body and adapted to be engaged by a hand of a person;

a bite receiving region provided proximate the second end of the body and adapted to be received in a mouth of an animal;

an aperture defined in the gripping region, said aperture extending between the front and the back of the body and transverse to the longitudinal axis, said aperture being configured to receive a first digit of a person's hand therethrough; and an indentation defined in the top of the body in the gripping region, said indentation located a distance vertically above the aperture and adapted to receive a second digit of the person's hand therein;

a transition region interposed between the gripping region and the bite receiving region;

wherein the gripping region increases in height and width moving in a longitudinal direction from the first end of the body towards the transition region;

wherein the height is measured from the top to the bottom of the body, and the width is measured between the front and back of the body; and wherein the transition region decreases in height and increases in width moving in the longitudinal direction from the gripping region towards the biting region.

11. A bite block comprising:

a body having a front and an opposed back, a top and an opposed bottom, a first end and an opposed second end, wherein a longitudinal axis of the body extends between the first end and the second end;

a gripping region provided proximate the first end of the body and adapted to be engaged by a hand of a person; and a bite receiving region provided proximate the second end of the body and adapted to be received in a mouth of an animal; said bite receiving region including:

a lingual plate forming the second end of the body, said lingual plate being elliptical in shape when the body is viewed from the second end, wherein said lingual plate is adapted to contact the animal's tongue when the bite receiving region is received in the mouth of the animal.

12. The bite block according to claim 11, wherein the lingual plate is oriented generally transverse to the longitudinal axis and includes an end wall oriented generally transverse to the longitudinal axis, and wherein the end wall is concavely curved and adapted to allow the animal's tongue to rest generally naturally in the mouth of the animal when contacted by the lingual plate.

13. The bite block according to claim 11, wherein the bite receiving region further includes:

an upper trough defined in the top of the body, said upper trough being adapted to receive one or more maxillary teeth of an upper jaw therein when the bite receiving region is received in the mouth of the animal;

a lower trough defined in the bottom of the body, said lower trough being adapted to receive one or more mandibular teeth of a lower jaw therein when the bite receiving region is received in the mouth of the animal; and wherein the upper trough an lower trough are located intermediate the lingual plate and the gripping region.

14. The bite block according to claim 13, further comprising a transition region located between the gripping region and the upper and lower troughs, wherein the transition region is of a greater height and width than a part of the bite receiving region in which the upper and lower troughs are defined.

15. The bite block according to claim 14, wherein the lingual plate is of a smaller width and a smaller height than a width and a height of the transition region proximate the upper and lower troughs, wherein the width and smaller width are measured vertically between the front and the back of the body, and the height and the smaller height are measured transversely between the top and the bottom of the body.

16. The bite block according to claim 14, wherein the lingual plate is of a greater width and a greater height than a width and a height of the transition region proximate the upper and lower troughs, wherein the width and greater width are measured vertically between the front and the back of the body, and the height and the greater height are measured transversely between the top and the bottom of the body.

17. A method of installing a bite block in an animal's mouth comprising:

providing a bite block with a body having a gripping region at a first end and a bite receiving region at a second end, and a longitudinal axis extending between the first end and the second end;

inserting a first digit of a person's hand through an aperture defined in the gripping region, wherein the aperture is oriented transverse to the longitudinal axis;

providing a lingual plate on the bite receiving region of the body, wherein the lingual plate is oriented generally transversely with respect to the longitudinal axis of the body;

orienting the lingual plate generally parallel to a palm of the person's hand;

inserting the lingual plate into the animal's mouth such that an end wall of the lingual plate contacts the animal's tongue;

receiving one or more maxillary teeth of the animal's upper jaw into an upper trough defined in the top of the body in the bite receiving region, wherein the upper trough is located inwardly from the lingual plate in a direction moving longitudinally towards the gripping region; and receiving one or more mandibular teeth of the animal's lower jaw into a lower trough defined in a bottom of the body in the bite receiving region, wherein the lower trough is opposed to the upper trough.

18. The method according to claim 17, further comprising:

resting a second digit of the person's hand in an indentation defined in a top of the body in the gripping region, wherein the indentation is located a distance vertically above the aperture.

19. The method according to claim 18, wherein the inserting of the first digit comprises inserting the person's middle finger through the aperture and the resting of the second digit comprises resting the person's index finger in the indentation.

20. The method according to claim 18, further comprising:

placing a thumb of the person's hand on the animal's muzzle;

placing one or both of a third digit and a fourth digit of the person's hand under the animal's lower jaw;

holding the animal's head stably between the thumb, the third digit, and the fourth digit of the person's hand; and performing a task in the animal's mouth with a second hand of the person.

21. The method according to claim 17, wherein the inserting of the first digit of the person's hand is preceded by selecting an appropriately-sized bite block based on a size of the mouth of the animal into which the bite block is to be inserted.

22. The method according to claim 17, further comprising: flaring the front, the back, a top, and a bottom of the body outwardly in a direction moving longitudinally from the first end of the body towards the bite receiving region, and shielding the person's first digit and the person's second digit from accidentally being bitten with the flaring front, back, top, and bottom of the body.

* * * * *